United States Patent
Kamiyama et al.

(10) Patent No.: US 9,684,392 B2
(45) Date of Patent: Jun. 20, 2017

(54) IN-CAR OPERATION DISPLAY DEVICE

(71) Applicant: CALSONIC KANSEI CORPORATION, Saitama-shi, Saitama (JP)

(72) Inventors: Hideaki Kamiyama, Saitama (JP); Masaharu Haginoya, Saitama (JP); Chihaya Imai, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 250 days.

(21) Appl. No.: 14/394,567

(22) PCT Filed: Apr. 12, 2013

(86) PCT No.: PCT/JP2013/061033
§ 371 (c)(1),
(2) Date: Oct. 15, 2014

(87) PCT Pub. No.: WO2013/157492
PCT Pub. Date: Oct. 24, 2013

(65) Prior Publication Data
US 2015/0084886 A1    Mar. 26, 2015

(30) Foreign Application Priority Data
Apr. 17, 2012    (JP) .................................. 2012-093590

(51) Int. Cl.
*G06F 3/0354*    (2013.01)
*B60K 35/00*    (2006.01)
(Continued)

(52) U.S. Cl.
CPC .......... *G06F 3/03548* (2013.01); *B60K 35/00* (2013.01); *B60K 37/06* (2013.01); *G06F 3/041* (2013.01); *B60K 2350/102* (2013.01); *B60K 2350/104* (2013.01); *B60K 2350/1024* (2013.01); *B60K 2350/1028* (2013.01);
(Continued)

(58) Field of Classification Search
CPC ..................................................... B60K 35/00
See application file for complete search history.

(56) References Cited

U.S. PATENT DOCUMENTS 5,305,014 A * 4/1994 Mutschler .......... B60H 1/00985
340/461
6,421,046 B1 * 7/2002 Edgren .................. B60K 35/00
340/691.1
(Continued)

FOREIGN PATENT DOCUMENTS

| JP | 04-229517 A | 8/1992 |
| JP | 2006-507695 A | 3/2006 |
| JP | 2007-076384 A | 3/2007 |

*Primary Examiner* — Priyank Shah
(74) *Attorney, Agent, or Firm* — Foley & Lardner LLP

(57) ABSTRACT

Provided is an in-car operation display device which improves the operability of a display unit. The display unit is used for indications and operations for car-installed functions such as settings and instructions of the car-installed functions. An operating means (first switch plate SpL, second switch plate SpR) includes an operating-plate portion (6L, 6R) configured to be operated to move along a display screen 5a of a display unit 5. The operating-plate portion (6L, 6R) includes a protruding switch portion (touch-sensor protrusion 10-15).

2 Claims, 20 Drawing Sheets

(51) Int. Cl.
   *B60K 37/06* (2006.01)
   *G06F 3/041* (2006.01)
(52) U.S. Cl.
   CPC  *B60K 2350/1036* (2013.01); *B60K 2350/925* (2013.01); *B60K 2350/945* (2013.01)

(56) References Cited

U.S. PATENT DOCUMENTS

| | | |
|---|---|---|
| 6,897,390 B2 | 5/2005 | Caldwell et al. |
| 2003/0121767 A1 | 7/2003 | Caldwell |
| 2008/0211779 A1* | 9/2008 | Pryor ................. G01C 21/3664 345/173 |
| 2014/0350784 A1* | 11/2014 | Imai ...................... G06F 3/0412 701/36 |

* cited by examiner (a)

(b)

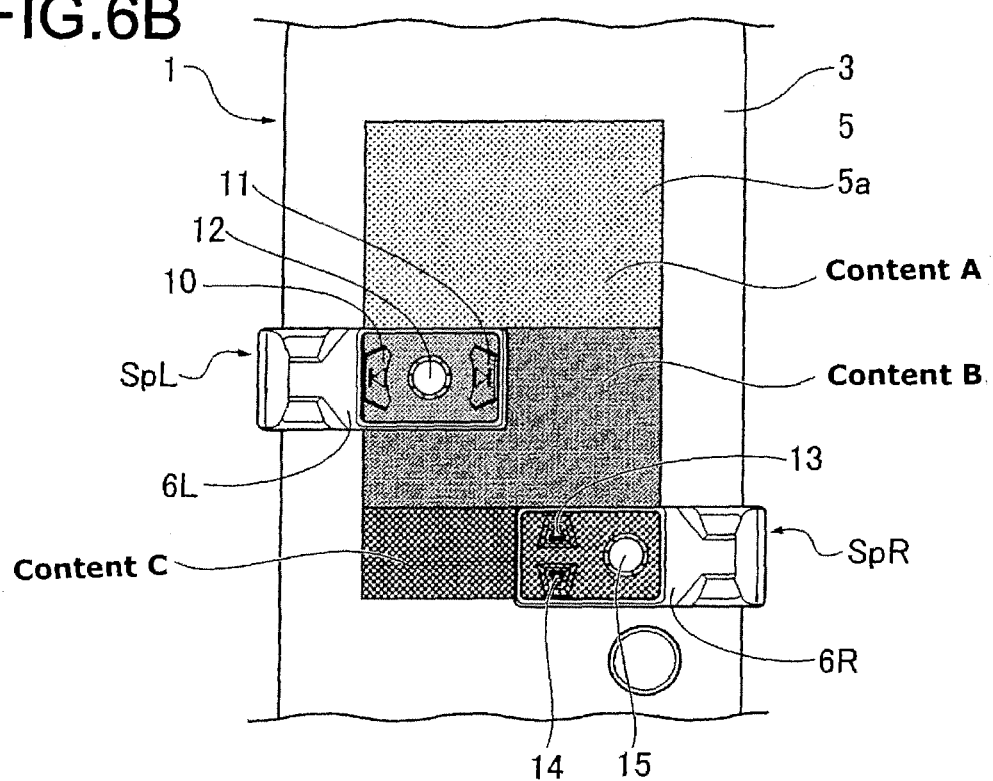

(a)

(b)

(a)

(b)

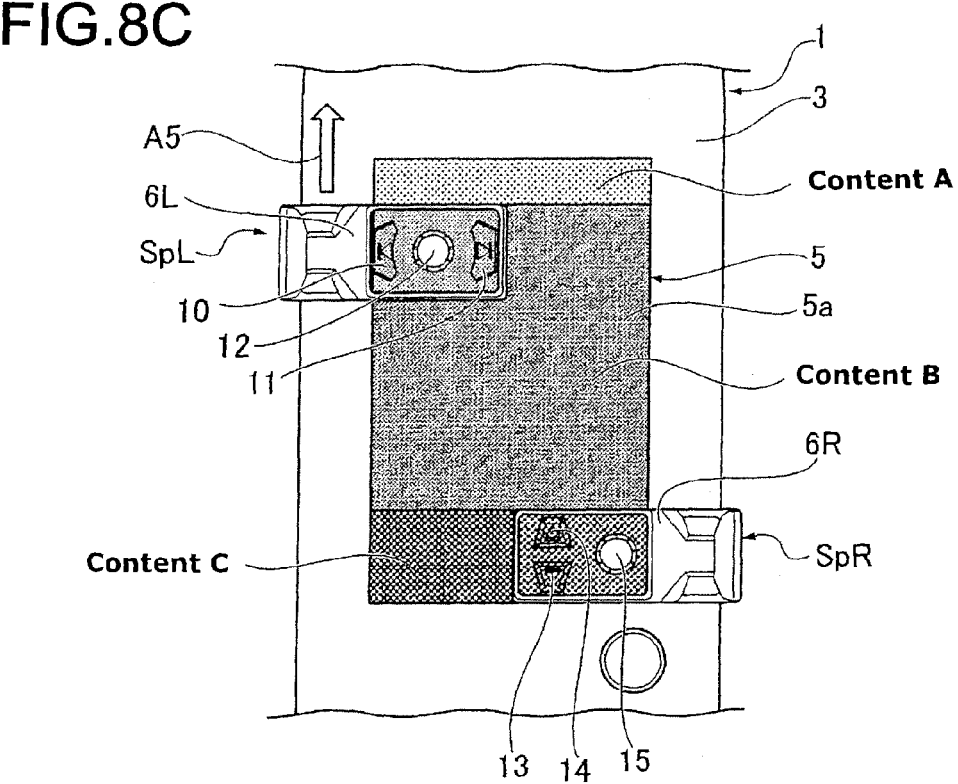
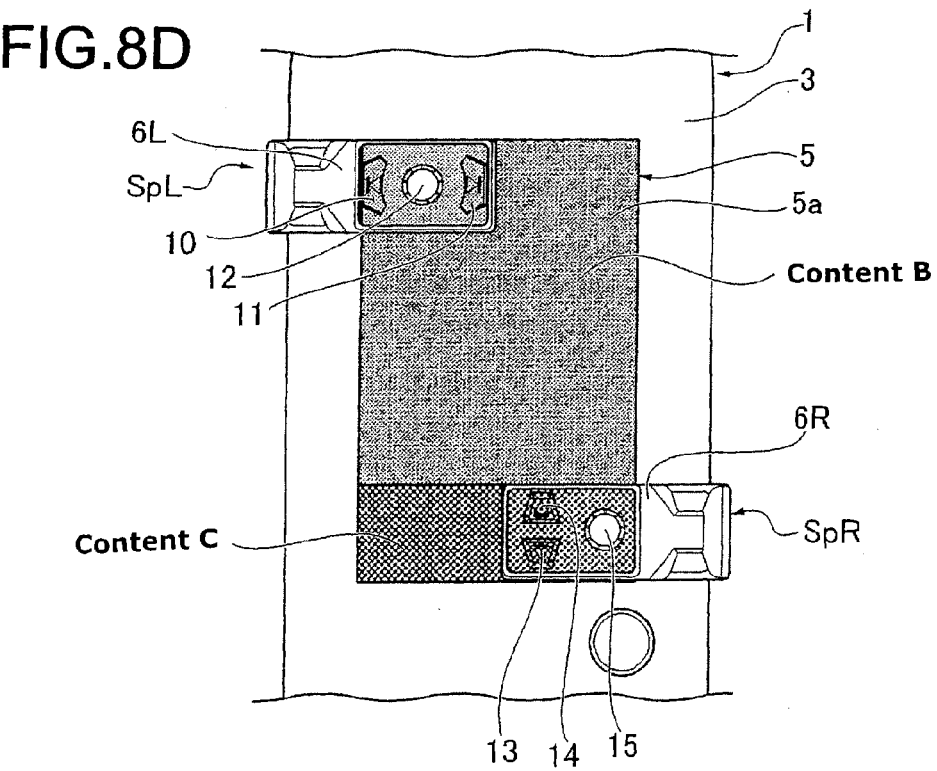

IN-CAR OPERATION DISPLAY DEVICE

TECHNICAL FIELD

The present invention relates to an in-car operation display device that includes a display unit for indications and operations such as setting and instruction of a car-installed function.

BACKGROUND ART

Conventionally, a car such as an automobile is equipped with a plurality of functions, e.g. an air conditioner, an audio device and a navigation device.

As such a car, the following configuration is known (for example, see Patent Literature 1). That is, a touch-panel-type liquid crystal display instrument (display unit), i.e. a touch display is provided on a center cluster located at the center of an instrument panel of the car. Images for an operating state of the air conditioner and a map of the navigation device or the like and operational menus of the air conditioner and the navigation device are displayed on the liquid crystal display instrument. By touch operations of a plurality of operational buttons (touch-sensitive operational buttons each indicating its operational content) of the operational menus, a setting/change of operating condition of the air conditioner and a changeover of image state displayed on the liquid crystal display instrument are controlled.

CITATION LIST

Patent Literature

Patent Literature 1: Japanese Patent Application Publication No. 2007-76384

SUMMARY OF THE INVENTION

Problem to be Solved

In the above-mentioned case, many touch-sensitive operational menus can be arranged (displayed) on a limited area of the touch display. However, each operational button of the operational menu displayed on the touch display has no physical concave-and-convex. Hence, it is difficult to recognize a location of the operational button by touch feeling, contrary to a conventional physical operational switch.

Accordingly, in the case that many operational menus are displayed on the touch display, an operator tends to gaze a screen of the touch display. Therefore, if a driver tries to operate the touch display while driving a car, it is necessary for the driver to carefully operate the touch display. Such operations of the touch display are inferior in operability.

It is therefore an object of the present invention to provide an in-car operation display device, devised to improve the operability of a display unit which is used for indications and operations such as a setting or instruction of car-installed function.

Solution to Problem

According to the present invention, there is provided an in-car operation display device comprising: a display unit including a touch-panel-type display screen on which an image of a car-installed function is displayed; an operating means configured to be operated such that a car state is varied based on the image of the car-installed function displayed on the display screen; and a control circuit configured to perform a display control for the image of the car-installed function, and to control the car-installed function by an operation of the operating means, wherein the operating means includes an operating-plate portion configured to be operated to move along the display screen of the display unit, and the operating-plate portion includes a protruding switch portion.

Effects of Invention

According to this feature, the operability of the display unit which is used for indications and operations such as a setting or instruction of car-installed function can be improved.

BRIEF EXPLANATION OF DRAWINGS

FIG. 6B An explanatory view showing a position of the first switch plate shown in FIG. 6A and image ranges of contents displayed on the touch display when the first switch plate has been moved to an up-down-directional intermediate portion.

FIG. 8C An explanatory view showing a variation of the image ranges of the contents when the first switch plate of FIG. 8B has been further upwardly moved.

FIG. 8D An explanatory view showing a variation of the image ranges of the contents when the first switch plate of FIG. 8A has been moved to the upper end portion of the touch display.

DETAILED DESCRIPTION OF INVENTION

Figure 1:
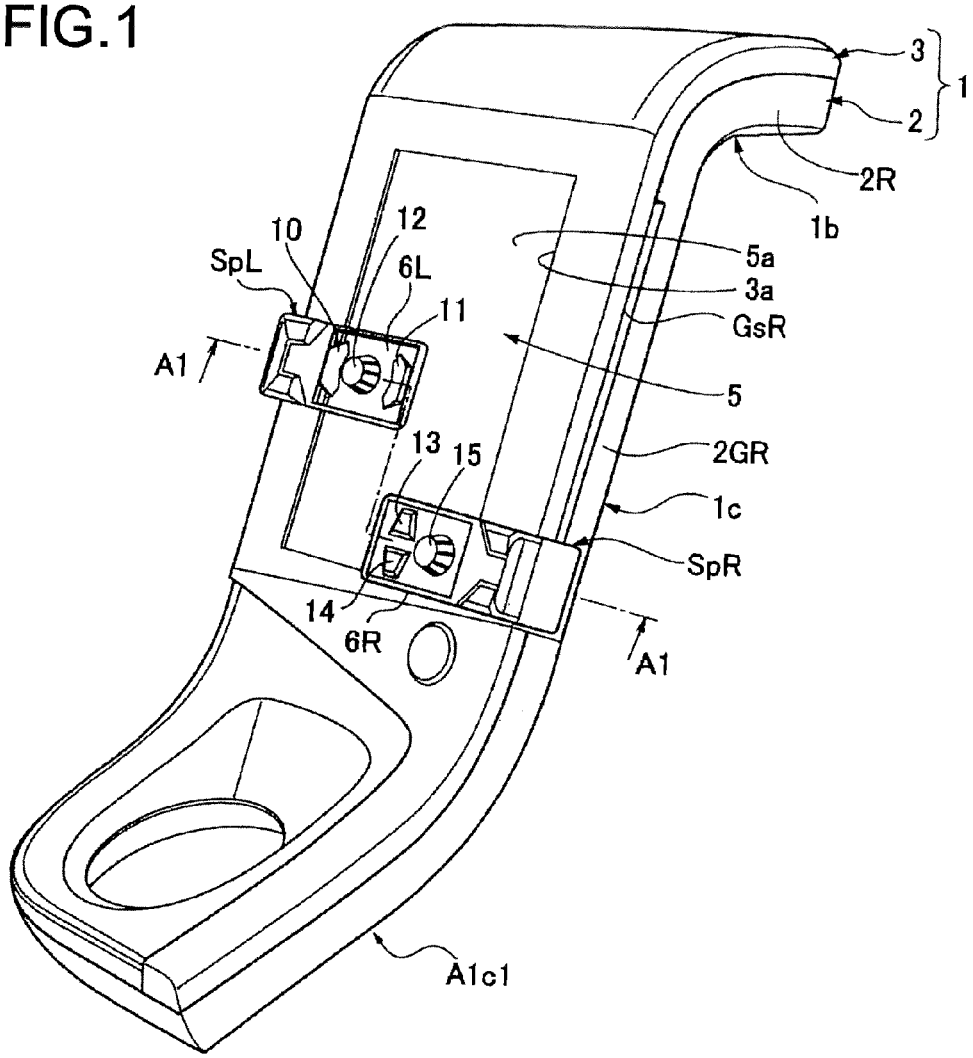
FIG. 1 An oblique perspective view showing a center cluster 1 to which an in-car operation display device according to the present invention is provided.

Hereinafter, embodiments of an in-car operation display device according to the present invention will be explained referring to the drawings.

First Embodiment

[Configuration]

Figure 2:
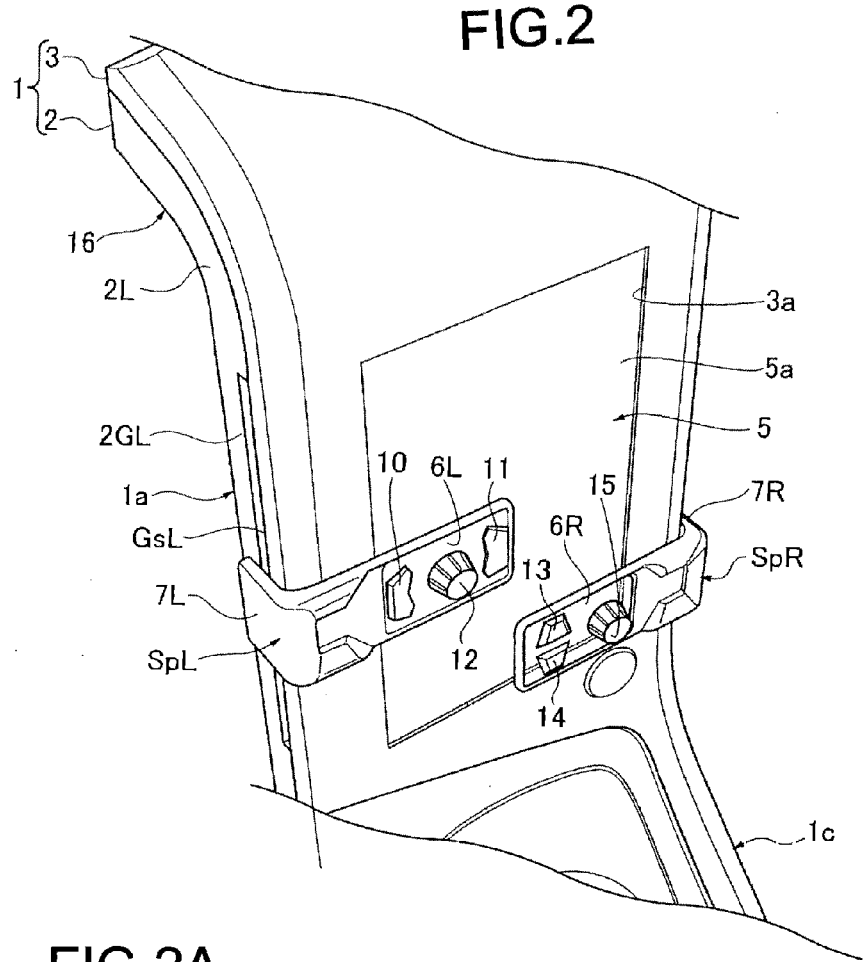
FIG. 2 An explanatory enlarged view of a portion on which the in-car operation display device is mounted, as viewed obliquely from a left side of FIG. 1.

FIG. 1 is a view showing a center duster 1 to which the in-car operation display device according to the present invention is provided. Moreover, FIG. 2 is an explanatory enlarged view of a sloping portion 1a of the center cluster 1 as viewed from an upper-left side of FIG. 1. The sloping portion 1a extends in a car-width direction and also in an up-down direction of the center cluster 1 of FIG. 1. With respect to the car-width direction, this sloping portion 1a is arranged on a center portion of a car-interior rear surface (not shown) of an instrument panel (not shown).

The center cluster 1 includes an upper attachment portion 1b and a lower attachment portion 1c. The upper attachment portion 1b is continuous with an upper end of the sloping portion 1a, and extends in a frontward direction. Moreover, the upper attachment portion 1b is provided in a connected row arrangement with an upper portion of the car-width-directional center portion of the instrument panel (not shown). The lower attachment portion 1c is continuous with a lower end of the sloping portion 1a, and extends in a rearward direction. This lower attachment portion 1c is provided in a connected row arrangement with a center console (not shown).

<Cluster Panel and Display Device>

The center cluster 1 further includes a lower cluster panel (lower cluster member) 2 and an upper cluster panel (upper cluster member) 3. The lower cluster panel 2 and the upper cluster panel 3 are coupled and fixed to each other, and are separable from each other. A latching hook, a fixing screw or the like is used as a coupling means for coupling and fixing these lower cluster panel 2 and upper cluster panel 3 to each other.

(Lower Cluster Panel 2)

Figure 2A:
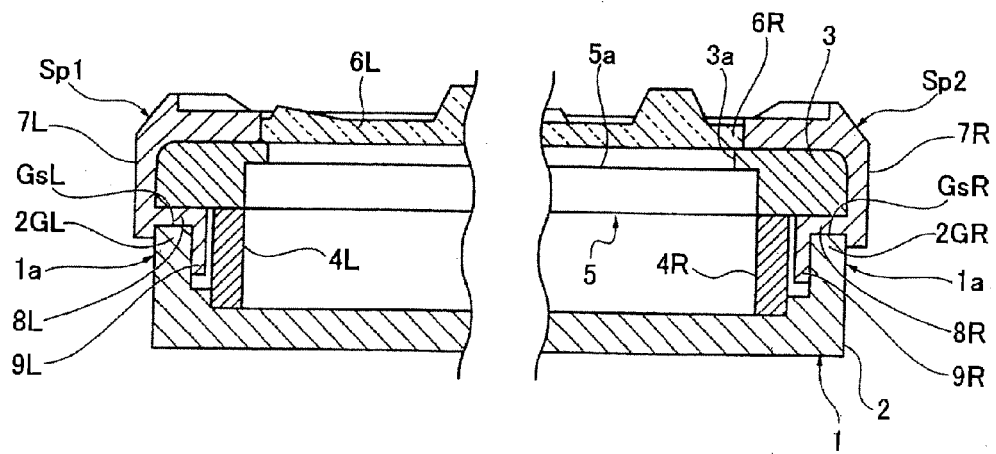
FIG. 2A A cross-sectional view taken along a line A1-A1 of FIG. 1.
Figure 2B:
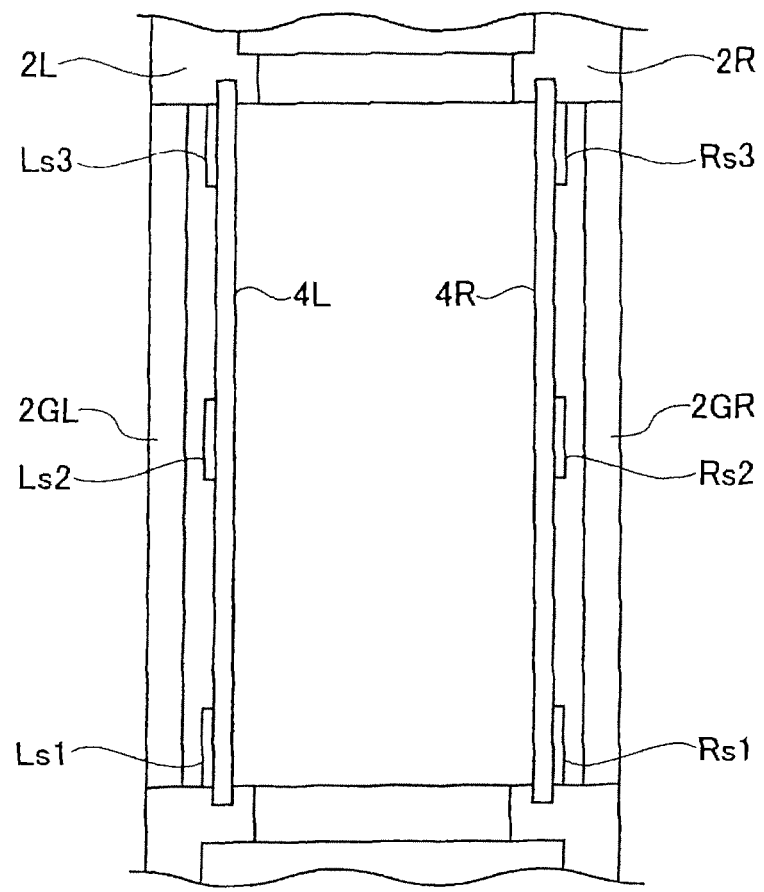
FIG. 2B A partial plan view of a lower cluster member shown in FIG. 2A.

As shown in FIGS. 2A and 2B, the lower cluster panel 2 includes a left-side wall 2L and a right-side wall 2R. The left-side wall 2L includes a left-guide-side wall portion 2GL at a location corresponding to the sloping portion 1a. The left-guide-side wall portion 2GL has a multilevel portion (multilevel concave). The right-side wall 2R includes a right-guide-side wall portion 2GR at a location corresponding to the sloping portion 1a. The right-guide-side wall portion 2GR has a multilevel portion (multilevel concave).

Moreover, as shown in FIGS. 2A and 2B, a left sensor substrate 4L is fixed to the lower cluster panel 2. This left sensor substrate 4L is placed in parallel with the left-guide-side wall portion 2GL such that a space exists between the left sensor substrate 4L and the left-guide-side wall portion 2GL. In the same manner, a right sensor substrate 4R is fixed to the lower cluster panel 2. This right sensor substrate 4R is placed in parallel with the right-guide-side wall portion 2GR such that a space exists between the right sensor substrate 4R and the right-guide-side wall portion 2GR.

As shown in FIG. 2B, a lower-left sensing section Ls1, a middle-left sensing section Ls2 and an upper-left sensing section Ls3 are mounted on the left sensor substrate 4L, as position sensors. The lower-left sensing section Ls1, the middle-left sensing section Ls2 and the upper-left sensing section Ls3 are respectively placed at one end portion (lower end portion), a central portion and another end portion (upper end portion) of the left sensor substrate 4L, along an extending direction of the left-guide-side wall portion 2GL. A lower-right sensing section Rs1, a middle-right sensing section Rs2 and an upper-right sensing section Rs3 are mounted on the right sensor substrate 4R, as position sensors. The lower-right sensing section Rs1, the middle-right sensing section Rs2 and the upper-right sensing section Rs3 are respectively placed at one end portion (lower end portion), a central portion and another end portion (upper end portion) of the right sensor substrate 4R, along an extending direction of the right-guide-side wall portion 2GR.

As each of these position sensors, a known position sensor such as a contact-type sensor, a switch-type sensor, a photoelectric-type sensor and a proximity-switch-type sensor can be used.

It is noted that a first linear potentiometer may be used as a left position sensor in place of the sensing sections Ls1 to Ls3, and a second linear potentiometer may be used as a right position sensor in place of the sensing sections Rs1 to Rs3. However, the first embodiment exemplifies a case that the sensing sections Ls1 to Ls3 and the sensing sections Rs1 to Rs3 are used.

(Upper Cluster Panel 3)

As shown in FIGS. 1, 2 and 2A, a display window 3a is formed in the upper cluster panel 3 at a location corresponding to the sloping portion 1a. A touch display 5 is attached to the upper cluster panel 3 as a display unit (displaying means) such that a display screen 5a of the touch display 5 is exposed through (i.e., faces) the display window 3a. The touch display 5 is constituted by a liquid crystal display instrument whose surface includes a touch panel, and the like.

(Guide Portion)

As shown in FIGS. 2 and 2A, a left guide slit GsL is formed between the left-guide-side wall portion 2GL of the lower cluster panel 2 and a left-side portion of the upper cluster panel 3. The left guide slit GsL extends in the up-down direction as a guide portion and is located at the sloping portion 1a. As shown in FIGS. 2 and 2A, a right guide slit GsR is formed between the right-guide-side wall portion 2GR of the lower cluster panel 2 and a right-side portion of the upper cluster panel 3. The right guide slit GsR extends in the up-down direction as the guide portion and is located at the sloping portion 1a.

<Operating Portion>

A first switch plate SpL is provided at a left portion of the touch display 5 as a first switch panel (operating portion) which is also referred to as a left slide-operation plate (left slide-operation panel). In the same manner, a second switch plate SpR is provided at a right portion of the touch display 5 as a second switch panel (operating portion) which is also referred to as a right slide-operation plate (right slide-operation panel).

Figure 3:
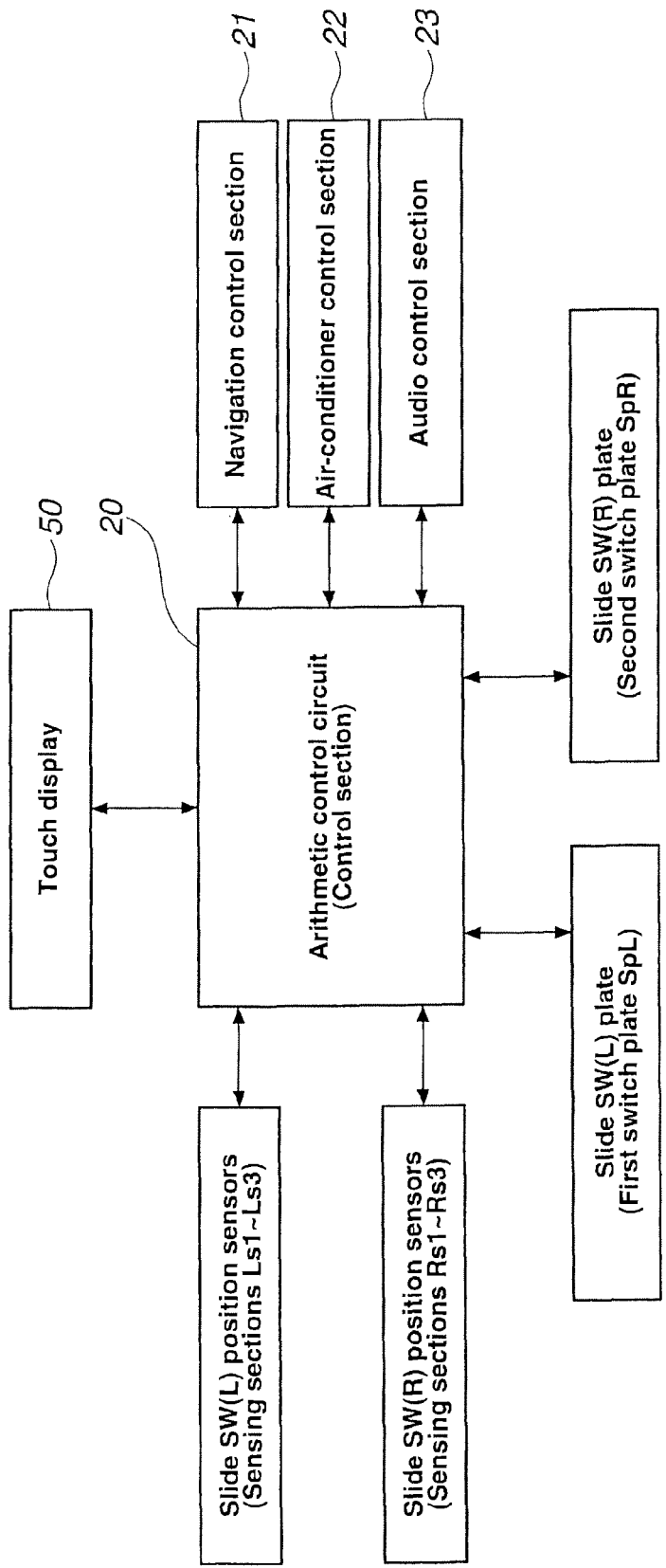
FIG. 3 A control-circuit block diagram of the in-car operation device which includes a touch display shown in FIG. 1.

In FIG. 3, the first switch plate SpL is denoted by "Slide SW(L) plate", and the second switch plate SpR is denoted by "Slide SW(R) plate".

The first and second switch plates SpL, SpR are used as operating portions for changing car-installed functions and images of the car-installed functions displayed on the display screen 5a.

Each of the first and second switch plates SpL, SpR is formed by a transparent or semitransparent panel made of an insulating resin material.

(First Switch Plate SpL)

As shown in FIGS. 2 and 2A, the first switch plate SpL includes a left operating-plate portion (left operating-panel portion) 6L and a panel main body (reference sign omitted). The left operating-plate portion 6L is provided as the operating portion, and extends along the display screen 5a such that a tip of the left operating-plate portion 6L reaches a center of the display screen 5a with respect to the car-width direction. The panel main body is formed in a substantially L-shape from a side plate portion 7L which is continuous with (i.e. is provided in a connected row arrangement with) one end portion of the left operating-plate portion 6L. As shown in FIG. 2A, the first switch plate SpL further includes a guide plate portion 8L and a contact plate portion 9L. The guide plate portion 8L is formed integrally with the side plate portion 7L, and is passed through the left guide slit GsL. The contact plate portion 9L is formed integrally with the guide plate portion 8L, and is located between the left-guide-side wall portion 2GL and the left sensor substrate 4L.

Figure 2C:
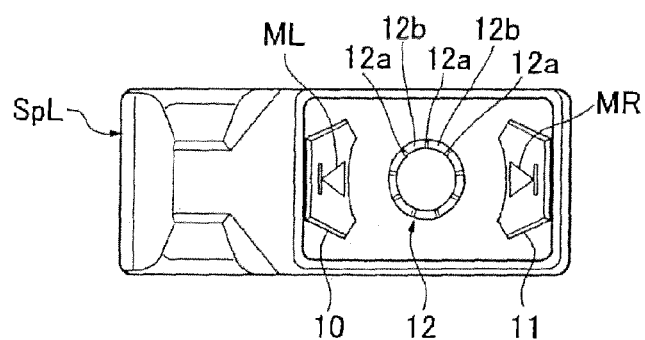
FIG. 2C (a) An explanatory partially-enlarged view of a left operating-plate portion shown in FIGS. 1 and 2. (b) An explanatory view of wirings of a first switch plate shown in FIGS. 1 and 2.
Figure 2C:
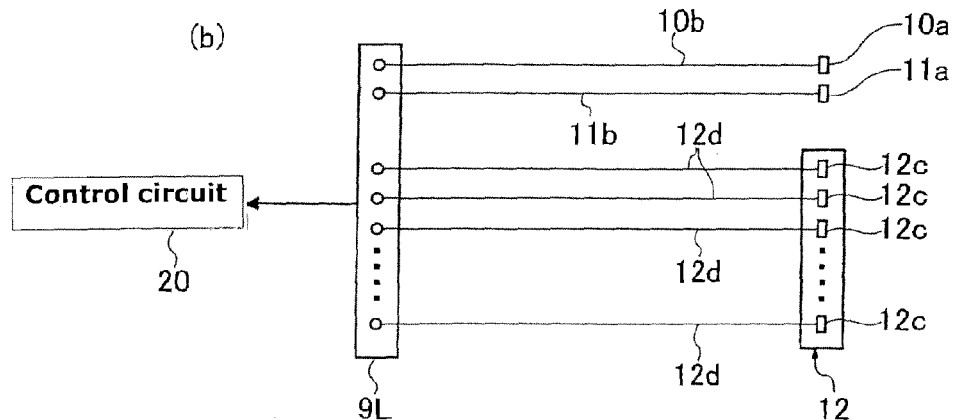

The left operating-plate portion 6L is formed integrally with a pair of touch-sensor protrusions 10 and 11 (switch protrusions for touch detection) and a touch-sensor protrusion 12 (switch protrusion for touch detection). The pair of touch-sensor protrusions 10 and 11 are located away from each other by a space in the car-width direction. Each of the pair of touch-sensor protrusions 10 and 11 is in the form of flat trapezoid. The touch-sensor protrusion 12 is in the form of dial protrusion, and is located between the pair of touch-sensor protrusions 10 and 11. As shown in FIG. 2C(a), a colored left-pointing mark ML is applied to (printed on) the touch-sensor protrusion 10, and a colored right-pointing mark MR is applied to the touch-sensor protrusion 11. Each of the colored left-pointing mark ML and the colored right-pointing mark MR is in a triangular shape and indicates its operating direction. Moreover, a plurality of grooves 12a are formed in a peripheral surface (outer circumferential surface) of the touch-sensor protrusion 12. The plurality of grooves 12a extend in a protruding direction of the touch-sensor protrusion 12, and are provided at intervals in a circumferential direction of the touch-sensor protrusion 12. Thereby, touch sensor portions 12b are provided between any adjacent two of the plurality of grooves 12a.

As shown in FIG. 2C(b), transparent electrodes (terminals) 10a and 11a are respectively provided on base ends of the touch-sensor protrusions 10 and 11. A transparent pattern wiring 10b is provided in the first switch plate SpL, and extends from the transparent electrode 10a to the contact plate portion 9L. In the same manner, a transparent pattern wiring 11b is provided in the first switch plate SpL, and extends from the transparent electrode 11a to the contact plate portion 9L.

As shown in FIG. 2C(b), a plurality of transparent electrodes (terminals) 12c are provided respectively inside the plurality of touch sensor portions 12b of the touch-sensor protrusion 12. Transparent pattern wirings 12d are provided in the first switch plate SpL, and respectively extend from the plurality of transparent electrodes 12c to the contact plate portion 9L.

The transparent electrodes 10a, 11a and 12c and the transparent pattern wirings 10b, 11b and 12d are formed by means of pattern printing (printed wiring) before forming the touch-sensor protrusions 10 and 11 and the touch sensor portions 12b. That is, in this embodiment, the touch-sensor protrusions 10, 11 and 12 can be formed after forming the transparent electrodes 10a, 11a and 12c and the transparent pattern wirings 10b, 11b and 12d.

Click catching mechanisms (not shown) are provided in the lower cluster panel 2 at locations corresponding to the respective sensing sections Ls, Ls2 and Ls3. Each of the click catching mechanisms catches or stops the first switch plate SpL by click stop. Each of the click catching mechanisms can be constructed by using a known mechanism such as a concave-and-convex and a plate-spring-and-depression.

(Second Switch Plate SpR)

As shown in FIGS. 1 and 2A, the second switch plate SpR includes a right operating-plate portion (right operating-panel portion) 6R and a panel main body (reference sign omitted). The right operating-plate portion 6R is provided as the operating portion, and extends along the display screen 5a such that a tip of the right operating-plate portion 6R reaches the center of the display screen 5a with respect to the car-width direction. The panel main body is formed in a substantially L-shape from a side plate portion 7R which is continuous with (i.e. is provided in a connected row arrangement with) one end portion of the right operating-plate portion 6R. As shown in FIG. 2A, the second switch plate SpR further includes a guide plate portion 8R and a contact plate portion 9R. The guide plate portion 8R is formed integrally with the side plate portion 7R, and is passed through the right guide slit GsR. The contact plate portion 9R is formed integrally with the guide plate portion 8R, and is located between the right-guide-side wall portion 2GR and the right sensor substrate 4R.

Figure 2D:
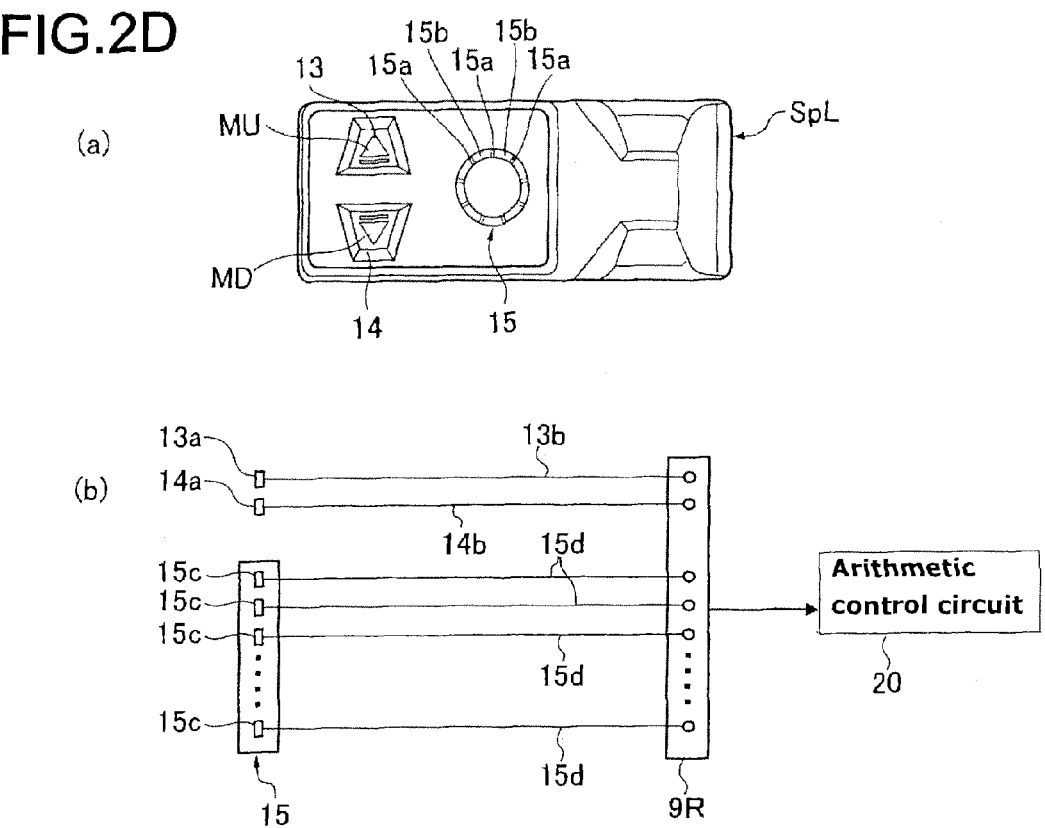
FIG. 2D (a) An explanatory partially-enlarged view of a right operating-plate portion shown in FIGS. 1 and 2. (b) An explanatory view of wirings of a second switch plate shown in FIGS. 1 and 2.

The right operating-plate portion 6R includes a pair of touch-sensor protrusions 13 and 14 (switch protrusions for touch detection) in a tip portion of the right operating-plate portion 6R. The pair of touch-sensor protrusions 13 and 14 are located away from each other by a space in the up-down direction. Each of the pair of touch-sensor protrusions 13 and 14 is in the form of flat trapezoid. Moreover, a base end portion of the right operating-plate portion 6R is formed integrally with a touch-sensor protrusion 15 (switch protrusion for touch detection). The touch-sensor protrusion 15 is in the form of dial protrusion. As shown in FIG. 2D, a colored up-pointing mark MU is applied to (printed on) the touch-sensor protrusion 13, and a colored down-pointing mark MD is applied to the touch-sensor protrusion 14. Each of the colored up-pointing mark MU and the colored down-pointing mark MD is in a triangular shape and indicates its operating direction. Moreover, a plurality of grooves 15a are formed in a peripheral surface (outer circumferential surface) of the touch-sensor protrusion 15. The plurality of grooves 15a extend in a protruding direction of the touch-sensor protrusion 15, and are provided at intervals in a circumferential direction of the touch-sensor protrusion 15. Thereby, touch sensor portions 15b are provided between any adjacent two of the plurality of grooves 15a.

As shown in FIG. 2D(b), transparent electrodes (terminals) 13a and 14a are respectively provided on base ends of the touch-sensor protrusions 13 and 14. A transparent pattern wiring 13b is provided in the second switch plate SpR, and extends from the transparent electrode 13a to the contact plate portion 9R. In the same manner, a transparent pattern wiring 14b is provided in the second switch plate SpR, and extends from the transparent electrode 14a to the contact plate portion 9R.

As shown in FIG. 2D(b), a plurality of transparent electrodes (terminals) 15c are provided respectively inside the plurality of touch sensor portions 15b of the touch-sensor protrusion 15. Transparent pattern wirings 15d are provided in the second switch plate SpR, and respectively extend from the plurality of transparent electrodes 15c to the contact plate portion 9R.

The transparent electrodes and the transparent pattern wirings are formed by means of pattern printing (printed wiring) before forming the touch-sensor protrusions 13 and 14 and the touch sensor portions 15b. That is, in this embodiment, the touch-sensor protrusions 13 and 14 and the touch sensor portions 15b can be formed after forming the transparent electrodes and the transparent pattern wirings.

Click catching mechanisms (not shown) are provided in the lower cluster panel 2 at locations corresponding to the respective sensing sections Rs1, Rs2 and Rs3. Each of the click catching mechanisms catches or stops the second switch plate SpR by click stop. Each of the click catching mechanisms can be constructed by using a known mechanism such as a concave-and-convex and a plate-spring-and-depression.

<Control Unit (Control Means)>

The transparent pattern wirings 10b, 11b and 12d are connected with flexible wirings (not shown) at the contact plate portion 9L. Thereby, the transparent pattern wirings 10b, 11b and 12d are connected through the flexible wirings to an arithmetic control circuit 20. Hence, the arithmetic control circuit 20 receives operations of the touch-sensor protrusions 10, 11 and 12 of the first switch plate SpL. In the same manner, the transparent pattern wirings 13b, 14b and 15d are connected with flexible wirings (not shown) at the contact plate portion 9R. Thereby, the transparent pattern wirings 13b, 14b and 15d are connected through the flexible wirings to the arithmetic control circuit 20. Hence, the arithmetic control circuit 20 receives operations of the touch-sensor protrusions 13, 14 and 15 of the second switch plate SpR. Moreover, the arithmetic control circuit 20 performs a display control of the touch display 5 and operational controls of a navigation control section 21, an air-conditioner control section 22 and an audio control section 23.

[Actions]

Next, actions of the in-car operation display device having the above-mentioned configurations will now be explained.

When electric power is turned on by an accessary switch (ACC, not shown) of the car, the arithmetic control circuit 20 receives outputs of the respective sensing sections Ls1 to Ls3 which are the position sensors. At the same time, the arithmetic control circuit 20 also receives outputs of the respective sensing sections Rs1 to Rs3 which are the position sensors. Then, the arithmetic control circuit 20 starts to control.

(1) Detection of Positions of the First and Second Switch Plates SpL, SpR

The lower-left sensing section Ls1 which is the position sensor detects the contact plate portion 9L of the first switch plate SpL when the first switch plate SpL is positioned at a lower end portion of the touch display 5. Then, the lower-left sensing section Ls1 outputs this detection signal (to the arithmetic control circuit 20). The middle-left sensing section Ls2 which is the position sensor detects the contact plate portion 9L of the first switch plate SpL when the first switch plate SpL is positioned at a central portion of the touch display 5 with respect to the up-down direction. Then, the middle-left sensing section Ls2 outputs this detection signal (to the arithmetic control circuit 20). Moreover, the upper-left sensing section Ls3 which is the position sensor detects the contact plate portion 9L of the first switch plate SpL when the first switch plate SpL is positioned at an upper end portion of the touch display 5. Then, the upper-left sensing section Ls3 outputs this detection signal (to the arithmetic control circuit 20).

Similarly, the lower-right sensing section Rs1 which is the position sensor detects the contact plate portion 9R of the second switch plate SpR when the second switch plate SpR is positioned at the lower end portion of the touch display 5. Then, the lower-right sensing section Rs1 outputs this detection signal (to the arithmetic control circuit 20). The middle-right sensing section Rs2 which is the position sensor detects the contact plate portion 9R of the second switch plate SpR when the second switch plate SpR is positioned at the central portion of the touch display 5 with respect to the up-down direction. Then, the middle-right sensing section Rs2 outputs this detection signal (to the arithmetic control circuit 20). Moreover, the upper-right sensing section Rs3 which is the position sensor detects the contact plate portion 9R of the second switch plate SpR when the second switch plate SpR is positioned at the upper end portion of the touch display 5. Then, the upper-right sensing section Rs3 outputs this detection signal (to the arithmetic control circuit 20).

In such a way, the detection signals derived from the respective sensing sections Ls1-Ls3 and Rs1-Rs3 are inputted to the arithmetic control circuit 20.

(2) Operations of the First Switch Plate SpL, the Second Switch Plate SpR and the Like In this embodiment, a car-installed function that is operated by the first switch plate SpL is an audiovisual function (audio device). An image for operating the audio device is shown on the touch display 5. In relation to this image, by operating the touch-sensor protrusions 10 and 11 of the first switch plate SpL, fast-forward operation (forward quick scan) and fast-reverse operation (reverse quick scan) can be conducted. Moreover, by changing a touch position among the plurality of touch sensor portions 12b of the touch-sensor protrusion 12, a volume level of sound can be increased or decreased. A driver can find (recognize) the touch-sensor protrusions 10, 11 and 12 of the first switch plate SpL by touch feeling. Therefore, the driver can operate (manipulate) the touch-sensor protrusions 10, 11 and 12 of the first switch plate SpL without visually identifying the touch-sensor protrusions 10, 11 and 12.

Moreover, in this embodiment, a car-installed function that is operated by the second switch plate SpR is an air-conditioning function (air conditioner). An image for operating the air conditioner is shown on the touch display 5. In relation to this image, by operating the touch-sensor protrusions 13 and 14 of the second switch plate SpR, a temperature setting can be turned up or down. Moreover, by changing a touch position among the plurality of touch sensor portions 15b of the touch-sensor protrusion 15, rotational speed of a blast fan can be increased or decreased so that a strength of air blow can be adjusted. A driver can find (recognize) the touch-sensor protrusions 13, 14 and 15 of the second switch plate SpR by touch feeling. Therefore, the driver can operate (manipulate) the touch-sensor protrusions 13, 14 and 15 of the second switch plate SpR without visually identifying the touch-sensor protrusions 13, 14 and 15.

In this embodiment, the car-installed function that is operated by the first switch plate SpL is the audiovisual function (audio device), while the car-installed function that is operated by the second switch plate SpR is the air-conditioning function (air conditioner). However, the car-installed functions which are operated by the first switch plate SpL and the second switch plate SpR may be the other functions (the other devices).

(3) Display Control

Figure 4:
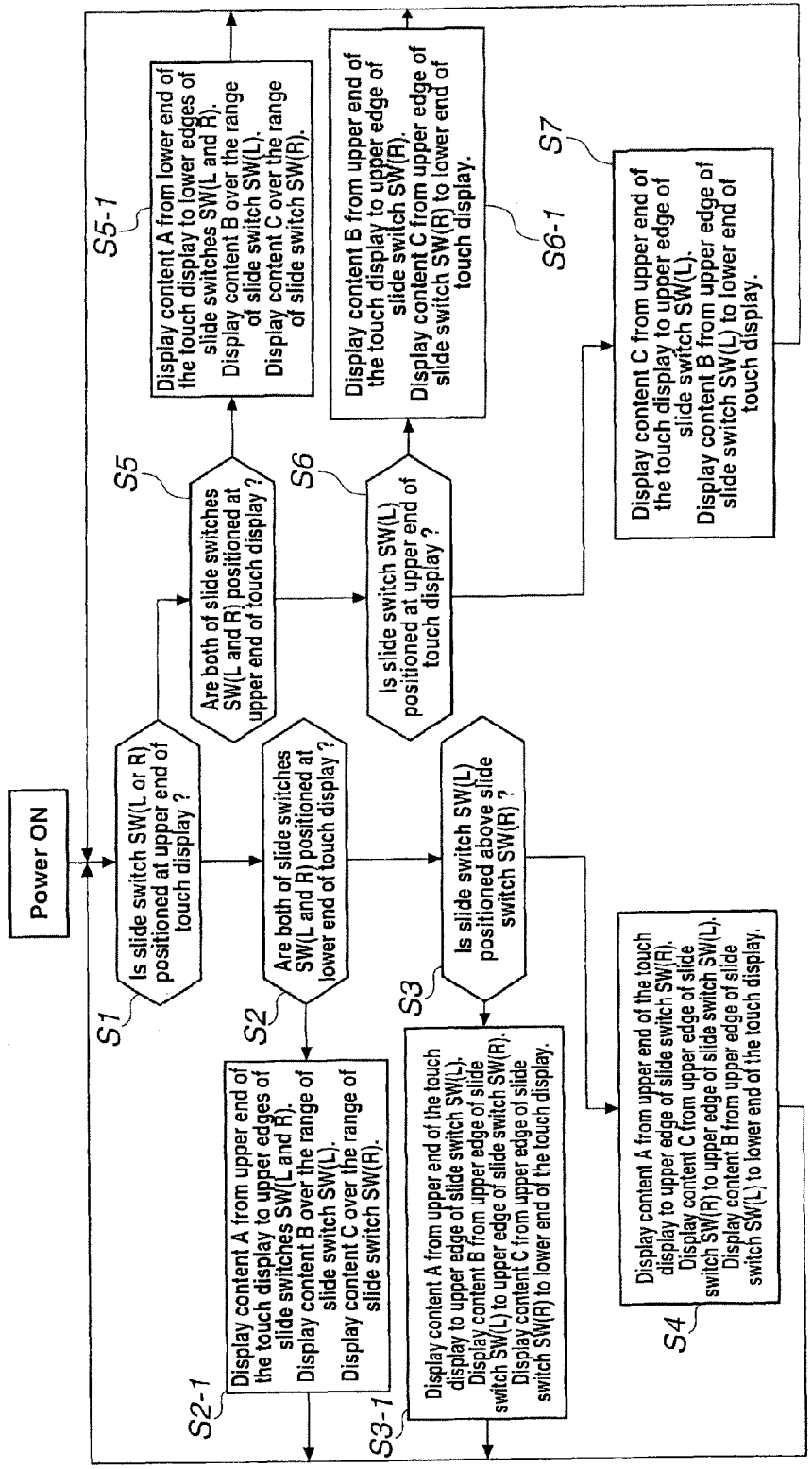
FIG. 4 A flowchart explaining actions of the in-car operation device which includes the touch display shown in FIG. 1.

On the basis of the above-mentioned detection signals, the arithmetic control circuit 20 determines a position of the first switch plate SpL by selecting from the lower end portion, the up-down-directional central portion and the upper end portion of the touch display 5. In the same manner, the arithmetic control circuit 20 determines a position of the second switch plate SpR by selecting from the lower end portion, the up-down-directional central portion and the upper end portion of the touch display 5. Moreover, on the basis of these detection signals, the arithmetic control circuit 20 starts a control action as shown by a flowchart of FIG. 4.

Figure 5:
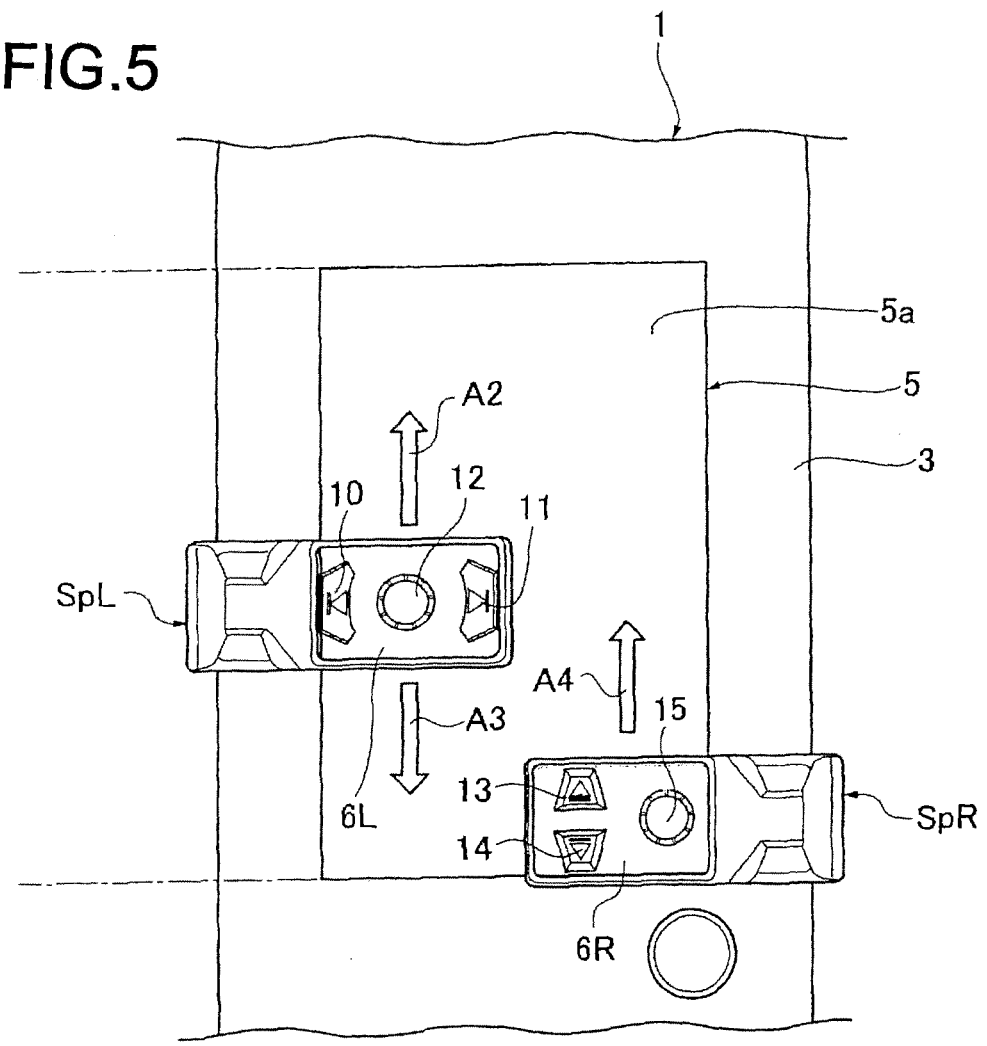
FIG. 5 An explanatory view for movement operations of the first and second switch plates shown in FIG. 1.

In the case that the first switch plate SpL exists at an up-down-directional intermediate portion of the touch display 5 as shown in FIG. 5, the first switch plate SpL can slide in the upper direction and also in the downward direction as shown by arrows A2 and A3. In the case that the second switch plate SpR exists at the lower end portion of the touch display 5 as shown in FIG. 5, the second switch plate SpR can slide in the upper direction shown by an arrow A4.

Step S1

When electric power is turned on by the accessary switch (ACC) of the car, the arithmetic control circuit 20 judges whether or not at least one of the first switch plate SpL and the second switch plate SpR (slide switch SW(L or R)) is positioned at the upper end of the touch display 5, at step S1. If any of the first switch plate SpL and the second switch plate SpR is not positioned at the upper end of the touch display 5, the program proceeds to step S2. If at least one of the first switch plate SpL and the second switch plate SpR is positioned at the upper end of the touch display 5, the program proceeds to step S5.

Step S2

At step S2, the arithmetic control circuit 20 judges whether or not both of the first switch plate SpL and the second switch plate SpR are positioned at the lower end of the touch display 5. If both of the first switch plate SpL and the second switch plate SpR are positioned at the lower end of the touch display 5, the program proceeds to step S 2-1. If at least one of the first switch plate SpL and the second switch plate SpR is not positioned at the lower end of the touch display 5, the program proceeds to step S3.

Step S2-1

In the case that the program proceeds from step S2 to step S2-1, both of the first switch plate SpL and the second switch plate SpR exist at the lower end of the touch display 5. In this case, the tip (right end) of the left operating-plate portion 6L of the first switch plate SpL faces the tip (left end) of the right operating-plate portion 6R of the second switch plate SpR to have a minute space between the tip of the left operating-plate portion 6L and the tip of the right operating-plate portion 6R.

Figure 6A:
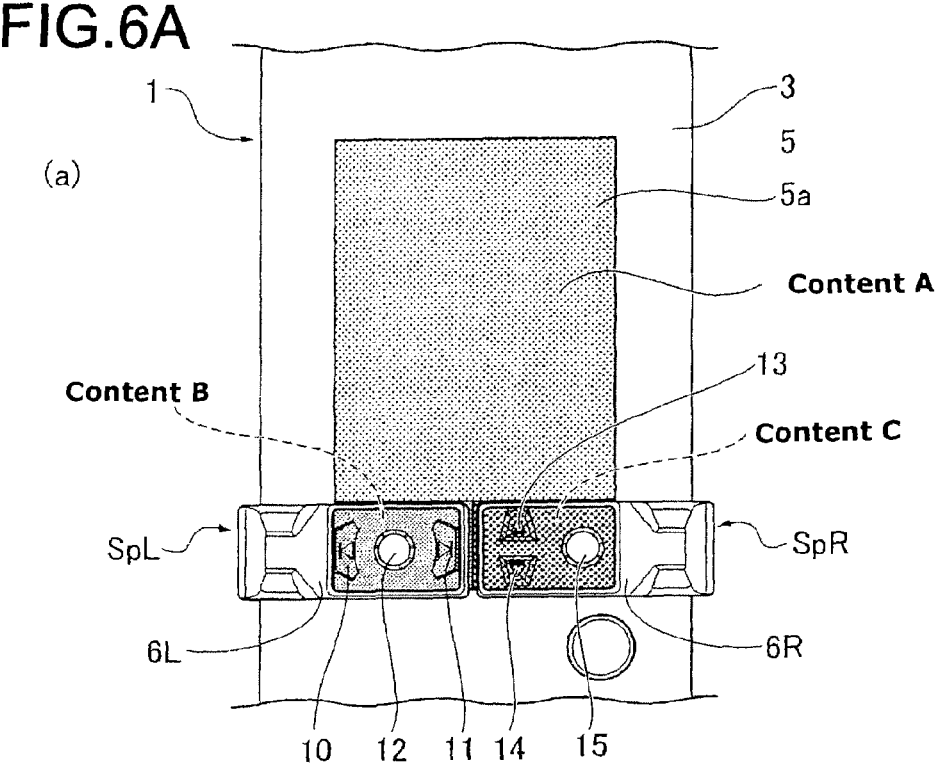
FIG. 6A (a) An explanatory view showing positions of the first and second switch plates of FIG. 1, and image ranges of contents displayed on the touch display. (b) An explanatory view showing one example of the contents shown in FIG. 6A(a).
Figure 6A:
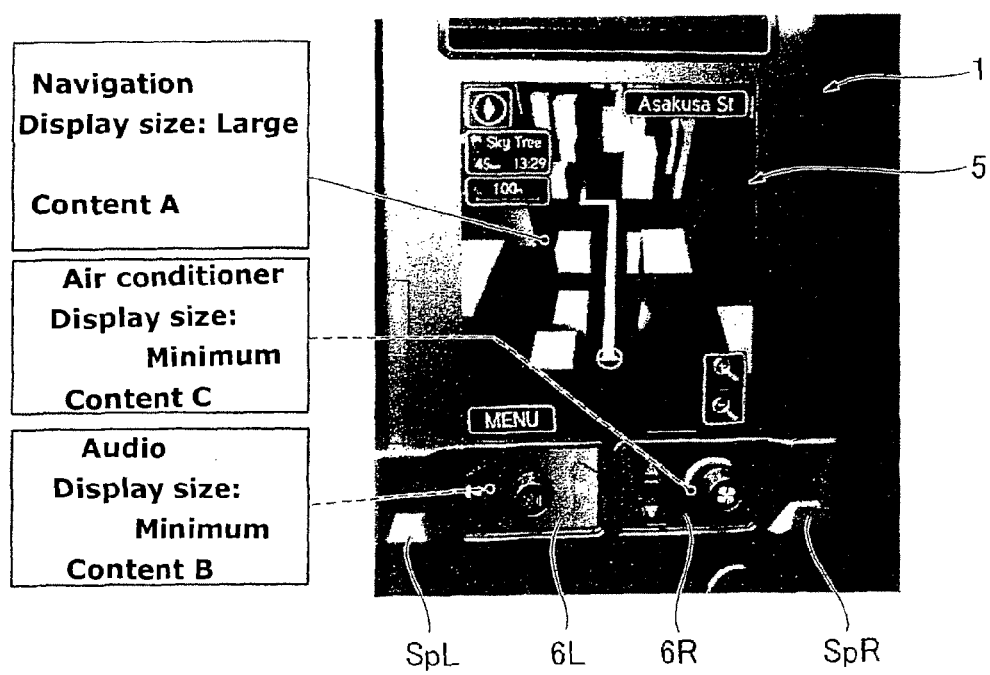

At step S2-1, the arithmetic control circuit 20 calls up (or retrieves) image information from the navigation control section 21. From this image information, the arithmetic control circuit 20 obtains a navigation image as shown in FIG. 6A(b), and displays this navigation image (image size: large) as a content A of FIG. 6A(a). That is, the navigation image is displayed over a range from upper ends of the first and second switch plates SpL and SpR (slide switches SW(L and R)) to the upper end of the touch display 5.

At the same time, the arithmetic control circuit 20 calls up (or retrieves) audio-control information which is used for controlling the audio device, from the audio control section 23. From this audio-control information, the arithmetic control circuit 20 obtains an audio-device-operation image for operating the audio device as show in FIG. 6A(b), and displays this audio-device-operation image (image size: minimum) as a content B of FIG. 6A(a). That is, the audio-device-operation image is displayed over a range from the lower end of the touch display 5 to the upper end of the first switch plate SpL (slide switch SW(L)).

Moreover, the arithmetic control circuit 20 calls up (or retrieves) air-conditioner information which is used for controlling the air conditioner, from the air-conditioner control section 22. From this air-conditioner information, the arithmetic control circuit 20 obtains an air-conditioner-operation image for operating the air conditioner as show in FIG. 6A(b), and displays this air-conditioner-operation image (image size: minimum) as a content C of FIG. 6A(a). That is, the air-conditioner-operation image is displayed over a range from the lower end of the touch display 5 to the upper end of the second switch plate SpR (slide switch SW(R)).

Accordingly, the minimum contents B and C are displayed respectively in left and right portions of the lower end portion of the touch display 5 such that the content B and the content C are arranged side by side in a line with respect to the right-left direction. On the other hand, the content A having a large size is displayed above the contents B and C.

In this example, the first switch plate SpL which is provided for operating the content B is located on, i.e., overlaps with (the image of) the content B, and the second switch plate SpR which is provided for operating the content C is located on, i.e., overlaps with (the image of) the content C. By touching (touch-operating) a menu bar, operational buttons and the like of the content A which appear on the touch display 5, a change control for displayed view and the like of the content A are conducted.

As mentioned above, the minimum contents B and C are displayed respectively in left and right portions of in the lower end portion of the touch display 5 such that the content B and the content C are arranged side by side. However, the driver can operate the touch-sensor protrusions 10, 11 and 12 of the first switch plate SpL without visually identifying the content B because the driver can find (recognize) the touch-sensor protrusions 10, 11 and 12 of the first switch plate SpL by touch feeling. Accordingly, with regard to the audio-device-operation image which is the content B, the fast-forward operation (forward quick scan) and the fast-reverse operation (reverse quick scan) can be done by operating the touch-sensor protrusions 10 and 11 of the first switch plate SpL, and moreover, the volume level of sound can be increased or decreased by changing a touch position among the plurality of touch sensor portions 12*b* of the touch-sensor protrusion 12.

In the same manner, the driver can operate the touch-sensor protrusions 13, 14 and 15 of the second switch plate SpR without visually identifying the content C because the driver can find (recognize) the touch-sensor protrusions 13, 14 and 15 of the second switch plate SpR by touch feeling. Accordingly, with regard to the air-conditioner-operation image which is the content C, the temperature setting can be turned up or down by operating the touch-sensor protrusions 13 and 14 of the second switch plate SpR, and moreover, the rotational speed of the blast fan can be increased or decreased to adjust the strength of air blow by changing a touch position among the plurality of touch sensor portions 15*b* of the touch-sensor protrusion 15.

A detailed explanation about operations of the first switch plate SpL and the second switch plate SpR will be omitted.

Step S3

At step S3, the arithmetic control circuit 20 judges whether or not the first switch plate SpL (slide switch SW(L)) is positioned above (i.e. takes an upper position relative to) the second switch plate SpR (slide switch SW(R)).

If the first switch plate SpL is positioned at the up-down-directional central portion of the touch display 5, the program proceeds to step S3-1.

On the other hand, if the first switch plate SpL is not positioned at the up-down-directional central portion of the touch display 5, the program proceeds to step S4.

Step S3-1

At step S3-1, the arithmetic control circuit 20 calls up (retrieves) image information from the navigation control section 21. From this image information, the arithmetic control circuit 20 obtains a navigation image as exemplified in FIG. 6A(b), and displays this navigation image as the content A over a range from the upper end of the first switch plate SpL to the upper end of the touch display 5.

At the same time, the arithmetic control circuit 20 calls up (retrieves) audio-control information which is used for controlling the audio device, from the audio control section 23. From this audio-control information, the arithmetic control circuit 20 obtains an audio-device-operation image for operating the audio device as exemplified in FIG. 6A(b), and displays this audio-device-operation image as the content B of FIG. 6B. That is, the audio-device-operation image is displayed over a range from the upper end of the first switch plate SpL (slide switch SW(L)) to the upper end of the second switch plate SpR (slide switch SW(R)).

Moreover, the arithmetic control circuit 20 calls up (retrieves) air-conditioner information which is used for operating the air conditioner, from the air-conditioner control section 22. From this air-conditioner information, the arithmetic control circuit 20 obtains an air-conditioner-operation image for operating the air conditioner as exemplified in FIG. 6A(b), and displays this air-conditioner-operation image as the content C of FIG. 6B. That is, the air-conditioner-operation image is displayed over a range from the upper end of the second switch plate SpR (slide switch SW(R)) to the lower end of the touch display 5 as shown in FIG. 6B.

Accordingly, the contents A and B each having a medium size and the content C having a small size are displayed sequentially from above, on the touch display 5. In this pattern, the contents A and B are easy to recognize.

Step S4

At step S4, the arithmetic control circuit 20 calls up (retrieves) image information from the navigation control section 21. From this image information, the arithmetic control circuit 20 obtains a navigation image as exemplified in FIG. 6A(b), and displays this navigation image as the content A of FIG. 6C. That is, the navigation image is displayed over a range from the upper end of the second switch plate SpR (slide switch SW(R)) to the upper end of the touch display 5.

Figure 6C:
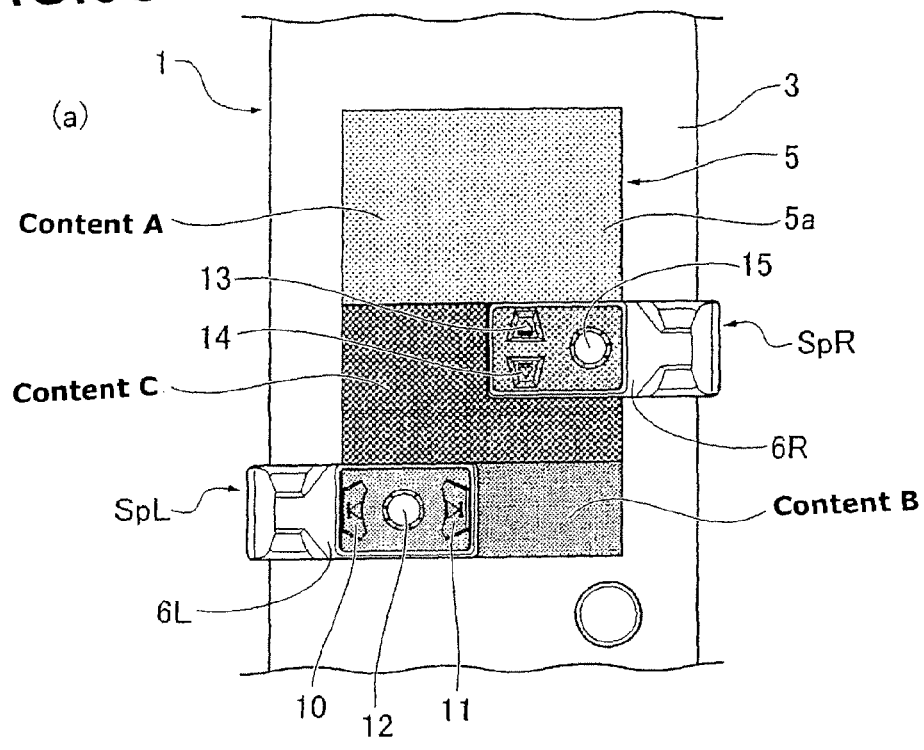
FIG. 6C (a) An explanatory view showing a position of the second switch plate shown in FIG. 6A and image ranges of contents displayed on the touch display when the second switch plate has been moved to the up-down-directional intermediate portion. (b) An explanatory view showing one example of the contents shown in FIG. 6C(a).
Figure 6C:
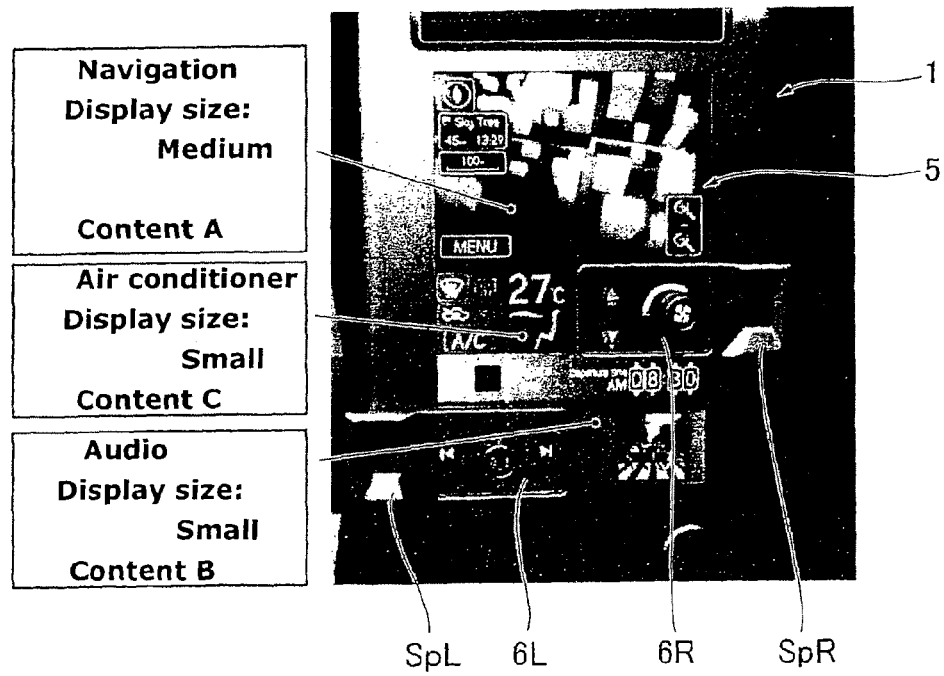

At the same time, the arithmetic control circuit 20 calls up (retrieves) air-conditioner information which is used for operating the air conditioner, from the air-conditioner control section 22. From this air-conditioner information, the arithmetic control circuit 20 obtains an air-conditioner-operation image for operating the air conditioner as exemplified in FIG. 6A(b), and displays this air-conditioner-operation image as the content C of FIG. 6C. That is, the air-conditioner-operation image is displayed over a range from the upper end of the first switch plate SpL (slide switch SW(L)) to the upper end of the second switch plate SpR (slide switch SW(R)) as shown in FIG. 6C.

Moreover, the arithmetic control circuit 20 calls up (or retrieves) audio-control information which is used for controlling the audio device, from the audio control section 23. From this audio-control information, the arithmetic control circuit 20 obtains an audio-device-operation image for operating the audio device as exemplified in FIG. 6A(b), and displays this audio-device-operation image as the content B of FIG. 6C. That is, the audio-device-operation image is displayed over a range from the upper end of the first switch plate SpL (slide switch SW(L)) to the lower end of the touch display 5, as shown in FIG. 6C.

Accordingly, the contents A and C each having the medium size and the content B having the small size are displayed sequentially from above, on the touch display 5. In this pattern, the contents A and C are easy to recognize.

Step S5

The following image-display controls are performed after step S5 although displayed patterns of the contents A to C are omitted in the drawings.

At step S5, the arithmetic control circuit 20 judges whether or not both of the first switch plate SpL (slide switch SW(L)) and the second switch plate SpR (slide switch SW(R)) are positioned at the upper end of the touch display 5.

If it is determined that both of the first switch plate SpL and the second switch plate SpR are positioned at the upper end of the touch display 5, the program proceeds to step S5-1. If it is determined that at least one of the first switch plate SpL and the second switch plate SpR is not positioned at the upper end of the touch display 5, the program proceeds to step S6.

Step S5-1

At step S5-1, the arithmetic control circuit 20 calls up (retrieves) image information from the navigation control section 21. From this image information, the arithmetic control circuit 20 obtains a navigation image as exemplified in FIG. 6A(b), and displays this navigation image (image size: maximum) as the content A. That is, the navigation image is displayed over a range from lower ends of the first and second switch plates SpL and SpR (slide switches SW(L and R)) to the lower end of the touch display 5.

At the same time, the arithmetic control circuit 20 calls up (or retrieves) audio-control information which is used for controlling the audio device, from the audio control section 23. From this audio-control information, the arithmetic control circuit 20 obtains an audio-device-operation image for operating the audio device as exemplified in FIG. 6A(b), and displays this audio-device-operation image (image size: minimum) as the content B. That is, the audio-device-operation image is displayed over a range from the upper end of the touch display 5 to the lower end of the first switch plate SpL.

Moreover, the arithmetic control circuit 20 calls up (or retrieves) air-conditioner information which is used for operating the air conditioner, from the air-conditioner control section 22. From this air-conditioner information, the arithmetic control circuit 20 obtains an air-conditioner-operation image for operating the air conditioner as exemplified in FIG. 6A(b), and displays this air-conditioner-operation image (image size: minimum) as the content C. That is, the air-conditioner-operation image is displayed over a range from the upper end of the touch display 5 to the lower end of the second switch plate SpR.

Accordingly, the minimum contents B and C are displayed respectively in left and right portions of the upper end portion of the touch display 5 such that the content B and the content C are arranged side by side in a line with respect to the right-left direction. On the other hand, the content A having a large size is displayed below the contents B and C. In this pattern, the content A is easy to recognize. By operating a menu bar, operational buttons and the like of the content A which appear on the screen of the touch display 5, a view control of the content A is conducted to control the function of the content A.

Step S6

At step S6, the arithmetic control circuit 20 judges whether or not the first switch plate SpL (slide switch SW(L)) is positioned at the upper end portion of the touch display 5.

If the first switch plate SpL is positioned at the upper end portion of the touch display 5, the program proceeds to step S6-1.

On the other hand, if the first switch plate SpL is not positioned at the upper end portion of the touch display 5, the program proceeds to step S7.

Step S6-1

In the case that the program proceeds from step S6 to step S6-1, the first switch plate SpL exists at the upper end portion of the touch display 5 whereas the second switch plate SpR does not exist at the upper end portion of the touch display 5.

At step S6-1, the arithmetic control circuit 20 calls up (retrieves) audio-control information which is used for controlling the audio device, from the audio control section 23. From this audio-control information, the arithmetic control circuit 20 obtains an audio-device-operation image for operating the audio device as exemplified in FIG. 6A(b). Then, the arithmetic control circuit 20 displays this audio-device-operation image as the content B over a range from the upper end of the touch display 5 to the upper end of the second switch plate SpR.

At the same time, the arithmetic control circuit 20 calls up (retrieves) air-conditioner information which is used for operating the air conditioner, from the air-conditioner control section 22. From this air-conditioner information, the arithmetic control circuit 20 obtains an air-conditioner-operation image for operating the air conditioner as exemplified in FIG. 6A(b). Then, the arithmetic control circuit 20 displays this air-conditioner-operation image as the content C over a range from the upper end of the second switch plate SpR to the lower end of the touch display 5.

Accordingly, the contents B and C each having a medium size are displayed sequentially from above, on the touch display 5. In this pattern, the contents B and C are easy to recognize.

Step S7

In the case that the program proceeds from step S6 to step S7, the first switch plate SpL does not exist at the upper end portion of the touch display 5 whereas the second switch plate SpR exists at the upper end portion of the touch display 5.

At step S7, the arithmetic control circuit 20 calls up (retrieves) air-conditioner information which is used for operating the air conditioner, from the air-conditioner control section 22. From this air-conditioner information, the arithmetic control circuit 20 obtains an air-conditioner-operation image for operating the air conditioner as exemplified in FIG. 6A(b). Then, the arithmetic control circuit 20 displays this air-conditioner-operation image as the content C over a range from the upper end of the first switch plate SpL to the upper end of the touch display 5.

At the same time, the arithmetic control circuit 20 calls up (retrieves) audio-control information which is used for controlling the audio device, from the audio control section 23. From this audio-control information, the arithmetic control circuit 20 obtains an audio-device-operation image for operating the audio device as exemplified in FIG. 6A(b). Then, the arithmetic control circuit 20 displays this audio-device-operation image as the content B over a range from the upper end of the first switch plate SpL to the lower end of the touch display 5.

Accordingly, the contents C and B each having a medium size are displayed sequentially in this order from above, on the touch display 5. In this pattern, the contents B and C are easy to recognize.

(Modified Example 1)

In the above-explained embodiment, the sensing sections Ls1 to Ls3 are provided for sensing the position of the first switch plate SpL with respect to the up-down direction. Similarly, the sensing sections Rs1 to Rs3 are provided for sensing the position of the second switch plate SpR with respect to the up-down direction. However, the configuration according to the present invention is not necessarily limited to this. For example, the up-down-directional position of the first switch plate SpL and/or the second switch plate SpR can be continuously sensed by a linear position sensor such as the above-mentioned linear potentiometer and a linear scale.

(Modified Example 2)

Figure 6D:
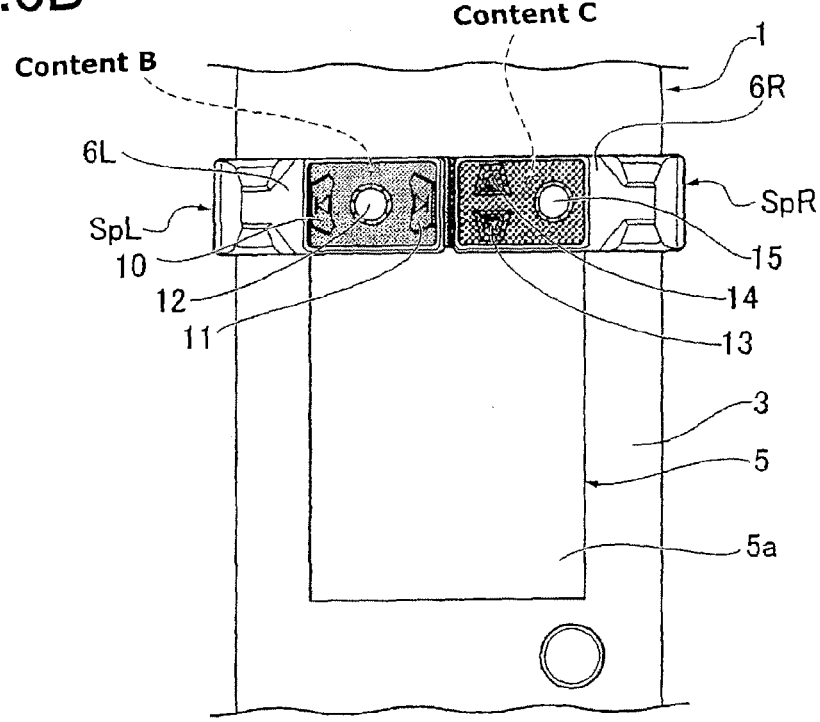
FIG. 6D An explanatory view showing image ranges of contents displayed on the touch display when the first and second switch plates are positioned at an upper end portion of the touch display, in another example.
Figure 6E:
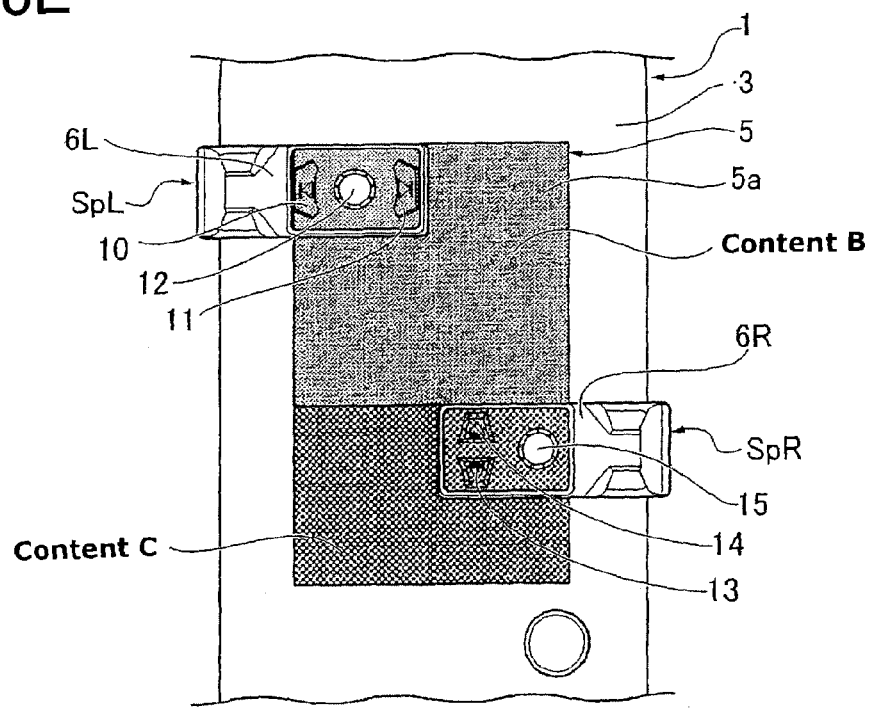
FIG. 6E An explanatory view showing image ranges of contents displayed on the touch display when the first switch plate is positioned at the upper end portion of the touch display and the second switch plate is positioned at the up-down-directional intermediate portion of the touch display, in another example.
Figure 6F:
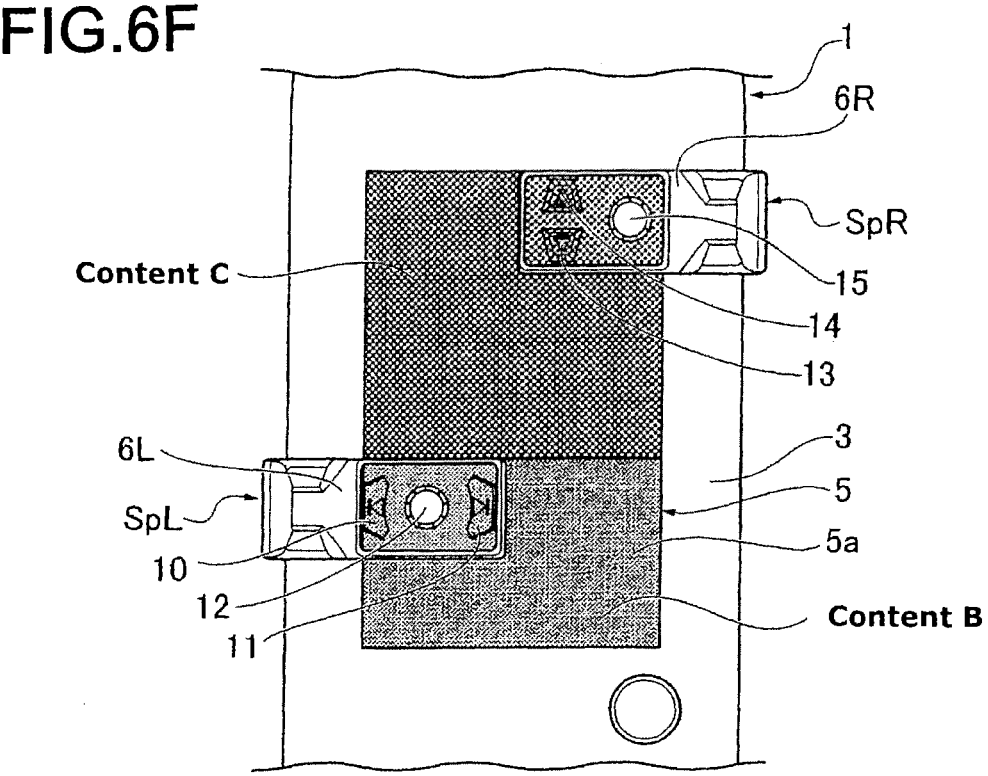
FIG. 6F An explanatory view showing image ranges of contents displayed on the touch display when the second switch plate is positioned at the upper end portion of the touch display and the first switch plate is positioned at the up-down-directional intermediate portion of the touch display, in another example.

Views as shown in FIGS. 6D to 6F may be adopted when at least one of the first switch plate SpL and the second switch plate SpR is positioned at the upper end portion of the touch display 5.

That is, as shown in FIG. 6D, when both of the first switch plate SpL and the second switch plate SpR are positioned at the upper end portion of the touch display 5; the content B is displayed over a range from the lower end of the first switch plate SpL to the upper end of the touch display 5, and the content C is displayed over a range from the lower end of the second switch plate SpR to the upper end of the touch display 5. In this case, no image may be displayed over a range from the lower ends of the first and second switch plates SpL, SpR to the lower end of the touch display 5. Alternatively, the above-mentioned content A may be displayed over the range from the lower ends of the first and second switch plates SpL, SpR to the lower end of the touch display 5.

Moreover, as shown in FIG. 6E, when the second switch plate SpR has been moved to the up-down-directional intermediate portion of the touch display 5 under a state where the first switch plate SpL exists at the upper end portion of the touch display 5; the content B is displayed over a range from the upper end of the second switch plate SpR to the upper end of the touch display 5, and the content C is displayed over a range from the lower end of the second switch plate SpR to the lower end of the touch display 5.

Moreover, as shown in FIG. 6F, when the first switch plate SpL has been moved to the up-down-directional intermediate portion of the touch display 5 under a state where the second switch plate SpR exists at the upper end portion of the touch display 5; the content C is displayed over a range from the upper end of the first switch plate SpL to the upper end of the touch display 5, and the content B is displayed over a range from the lower end of the first switch plate SpL to the lower end of the touch display 5.

(4) Other Example of Display Control (View Control)

Figure 7:
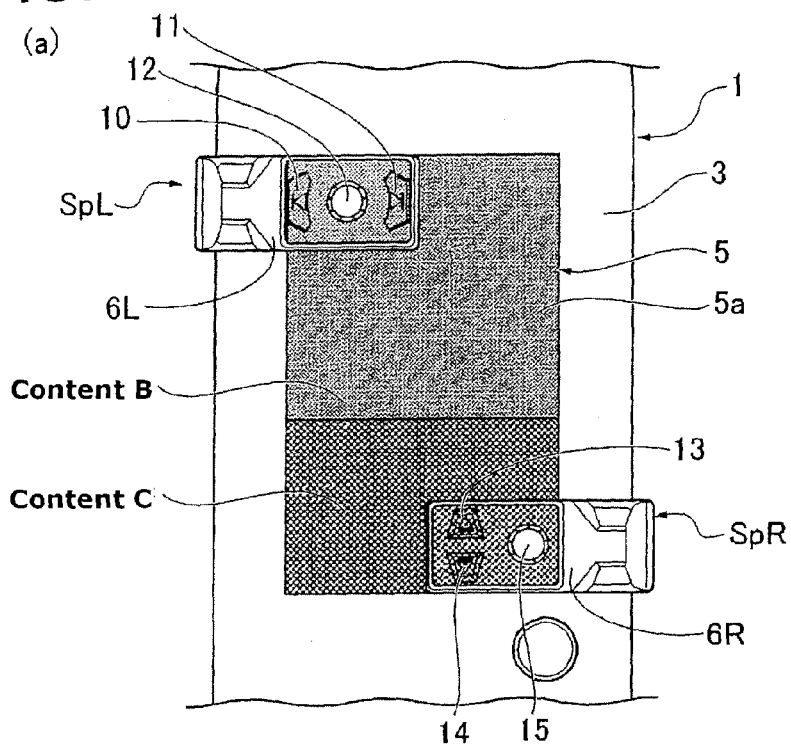
FIG. 7 (a) An explanatory view showing image ranges of the contents in a different way from the case of FIGS. 1 to 6C. (b) An explanatory view showing image ranges of the contents in a different way from the case of FIGS. 1 to 6C.
Figure 7:
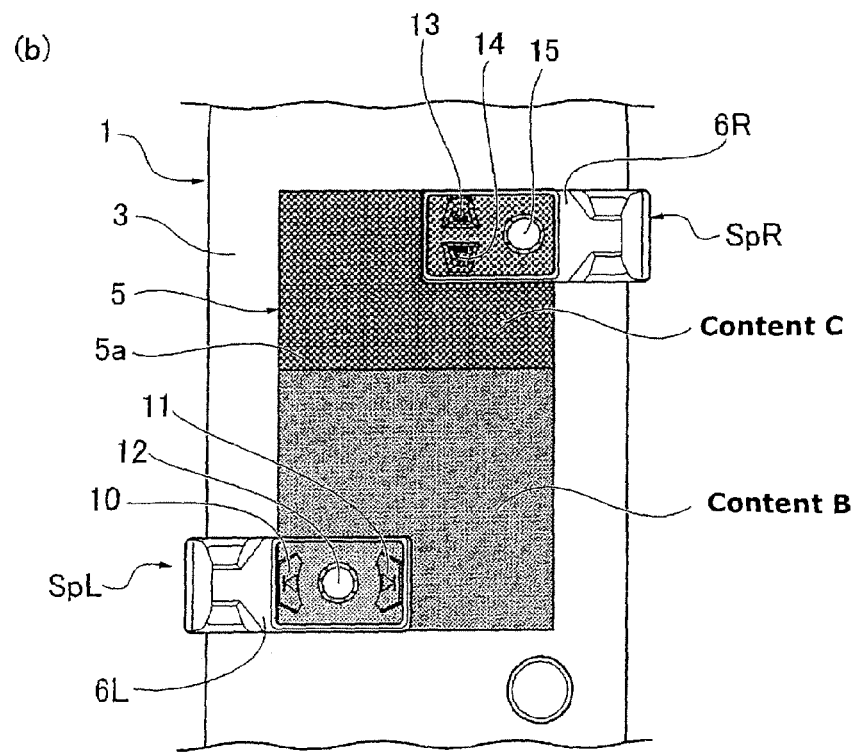

Views as shown in FIGS. 7(a) and 7(b) may be adopted, in the case that one of the first switch plate SpL and the second switch plate SpR is positioned at the upper end portion of the touch display 5 and another of the first switch plate SpL and the second switch plate SpR is positioned at the lower end portion of the touch display 5.

That is, in the case that the first switch plate SpL is positioned at the upper end portion of the touch display 5 and the second switch plate SpR is positioned at the lower end portion of the touch display 5 as shown in FIG. 7(a), the content B can be displayed on an upper portion of the touch display 5 so that the content C is displayed on a lower portion of the touch display 5.

Moreover, in the case that the second switch plate SpR is positioned at the upper end portion of the touch display 5 and the first switch plate SpL is positioned at the lower end portion of the touch display 5 as shown in FIG. 7(b), the content C can be displayed on an upper portion of the touch display 5 so that the content B is displayed on a lower portion of the touch display 5.

Also in this example, the first switch plate SpL for operating the content B is located on, i.e., overlaps with (the image of) the content B whereas the second switch plate SpR for operating the content C is located on, i.e., overlaps with (the image of) the content C.

(5) Other Example of Display Control

Figure 8A:
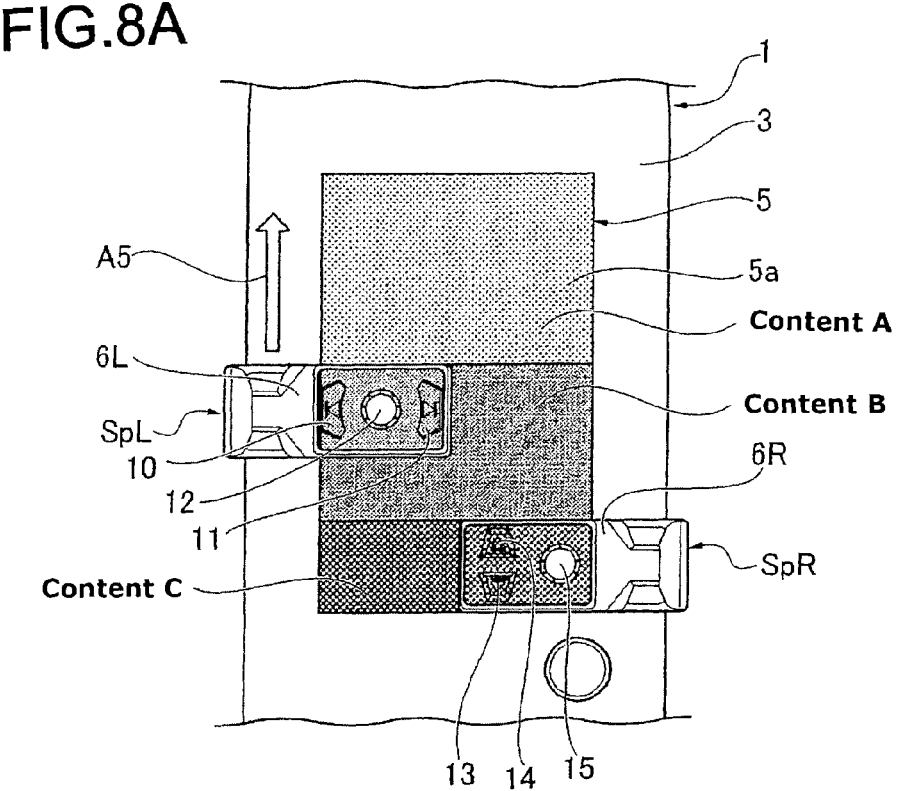
FIG. 8A An explanatory view showing a variable state of the image ranges of contents displayed on the touch display in other example when the first switch plate shown in FIGS. 1 and 2 is in an upward position.

In this example, the position of each of the first switch plate SpL and the second switch plate SpR with respect to the up-down direction is continuously sensed by a potentiometer, a linear scale or the like. As shown in FIG. 8A, the arithmetic control circuit 20 displays the image of the content A over a range from the upper end of the first switch plate SpL to the upper end of the touch display 5, displays the image of the content B over a range from the upper end of the first switch plate SpL to the upper end of the second switch plate SpR, and displays the image of the content C over a range from the upper end of the second switch plate SpR to the lower end of the touch display 5.

Figure 8B:
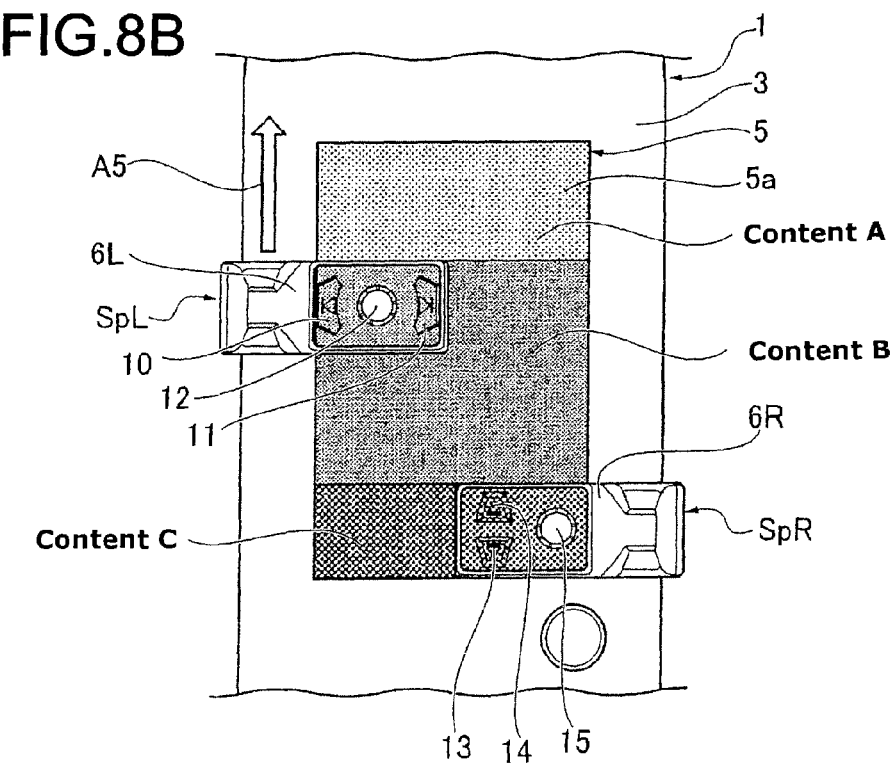
FIG. 8B An explanatory view showing a variation of the image ranges of the contents when the first switch plate of FIG. 8A has been upwardly moved.

Under this situation, the first switch plate SpL is operatively moved in the upper direction as shown by an arrow A5. At this time, by sensing the up-down-directional position of the first switch plate SpL, the arithmetic control circuit 20 gradually reduces the image of the content A and gradually enlarges the image of the content B as shown in FIGS. 8B and 8C. Then, when the first switch plate SpL reaches the upper end of the touch display 5 as shown in FIG. 8D, the arithmetic control circuit 20 removes (i.e. does not display) the image of the content A and maximizes the image of the content B.

(6) Other Example of Display Control

Figure 9:
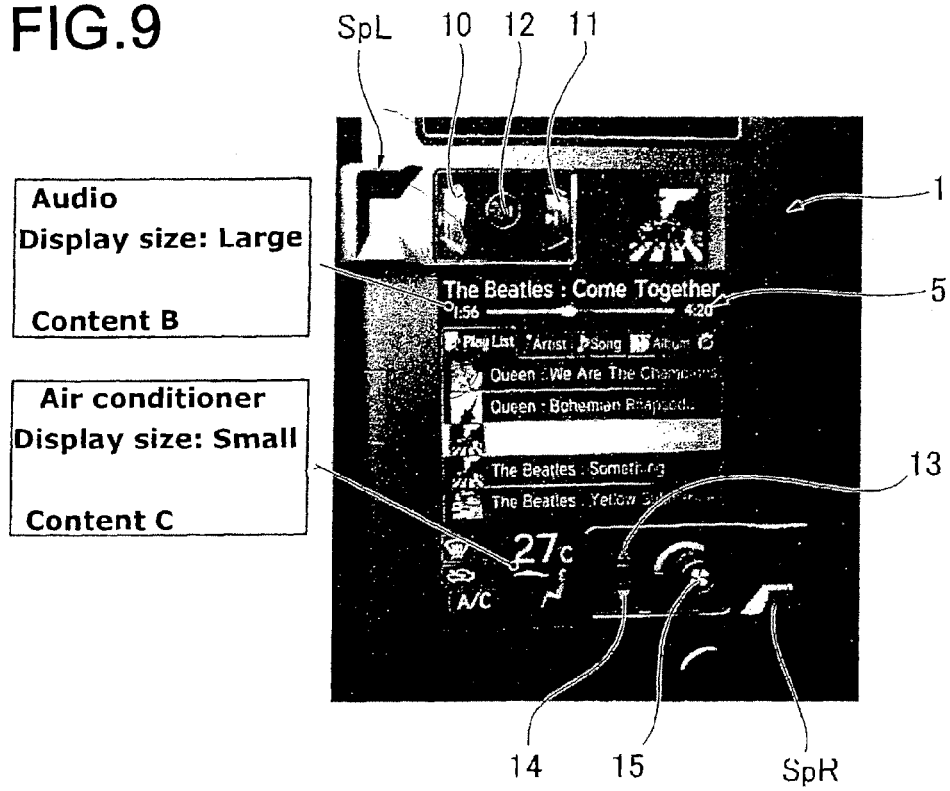
FIG. 9 An explanatory view showing image ranges of the contents in a different way from the case of FIGS. 1 to 6C.

As shown in FIG. 9, when the first switch plate SpL is positioned at the upper end portion of the touch display 5 and the second switch plate SpR is positioned at the lower end portion of the touch display 5, the audio-device-operation image of the content B can be displayed over a range from the upper end of the second switch plate SpR to the upper end of the touch display 5 so that the air-conditioner-operation image of the content C is displayed over a range from the upper end of the second switch plate SpR to the lower end of the touch display 5.

Figure 10:
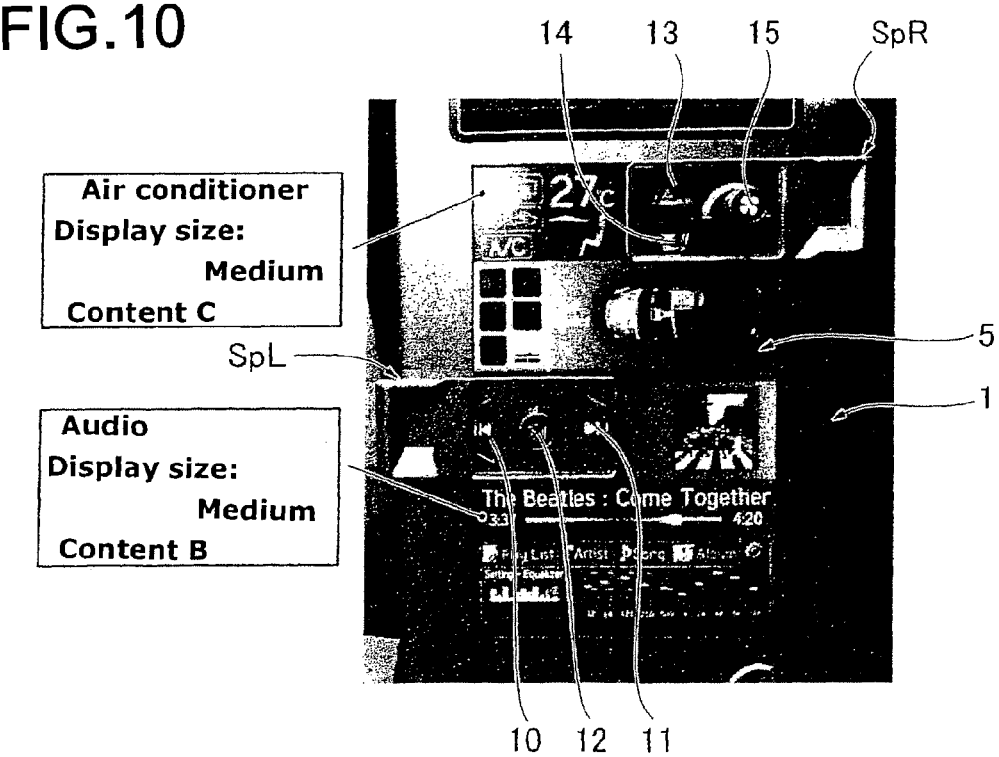
FIG. 10 An explanatory view showing image ranges of the contents in a different way from the case of FIGS. 1 to 6C.

Moreover, as shown in FIG. 10, when the first switch plate SpL is positioned at the up-down-directional central portion of the touch display 5 and the second switch plate SpR is positioned at the upper end portion of the touch display 5, the air-conditioner-operation image of the content C can be displayed over a range from the upper end of the first switch plate SpL to the upper end of the touch display 5 so that the audio-device-operation image of the content B is displayed over a range from the upper end of the first switch plate SpL to the lower end of the touch display 5.

[Second Embodiment]

In the above-explained first embodiment, the first switch plate SpL and the second switch plate SpR are respectively provided at both sides of the touch display 5. However, the configuration according to the present invention is not necessarily limited to this.

Figure 11:
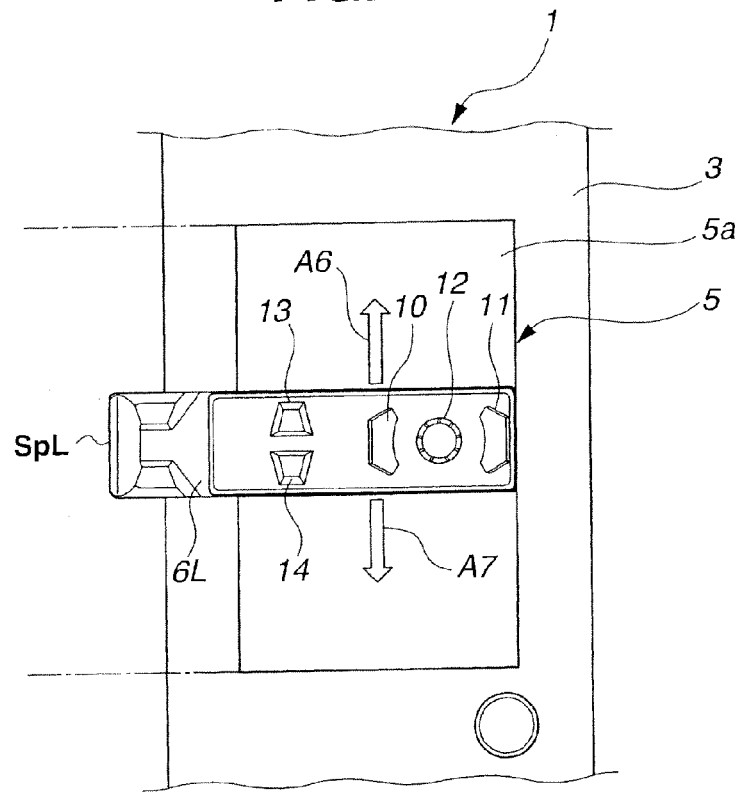
FIG. 11 An explanatory view showing another embodiment of the in-car operation display device according to the present invention.

For example, as shown in FIG. 11, only the first switch plate SpL may be provided by omitting the second switch plate SpR of the first embodiment. In such a case, the left operating-plate portion 6L of the first switch plate SpL may be set to have a length equal to an entire width of the touch display 5 with respect to the right-left direction. In this case, the touch-sensor protrusions 13 and 14 as provided to the second switch plate SpR of the first embodiment may be provided to the left operating-plate portion 6L of the first switch plate SpL in addition to the touch-sensor protrusions 10, 11 and 12 provided to the left operating-plate portion 6L.

Figure 12:
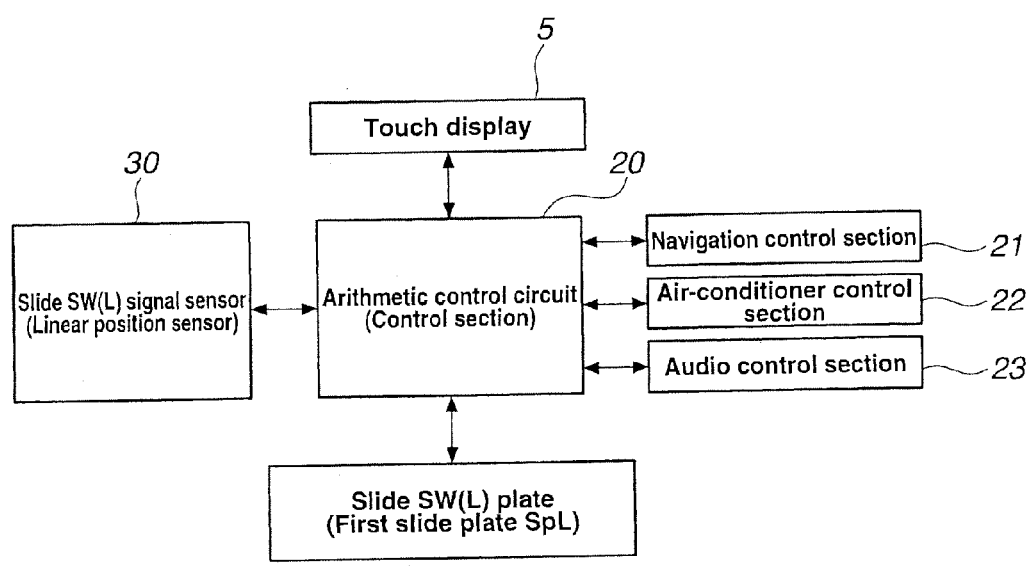
FIG. 12 A control-circuit block diagram of the in-car operation device shown in FIG. 11.

In this embodiment, the arithmetic control circuit 20 shown in FIG. 12 receives touch-operation signals derived from the touch-sensor protrusions 10, 11, 12, 13 and 14 of the first switch plate SpL. Moreover, in this embodiment, the up-down-directional position of the first switch plate SpL can be continuously (in a stepless manner) detected by a linear position sensor (Slide-SW(L) position sensor) 30 such as a linear potentiometer and a linear sensor. Position signals detected by this linear position sensor (Slide-SW(L) position sensor) 30 are inputted into the arithmetic control circuit 20.

The arithmetic control circuit 20 carries out the display control of the touch display 5 for the respective contents on the basis of the detected position signals, and controls or actuates the navigation control section 21, the air-conditioner control section 22 and the audio control section 23. Moreover, the arithmetic control circuit 20 carries out the operational controls and the display controls for the functions of car-installed devices corresponding to the contents of the touch display 5, on the basis of the touch-operation signals derived from the touch-sensor protrusions 10, 11, 12, 13 and 14.

Figure 13A:
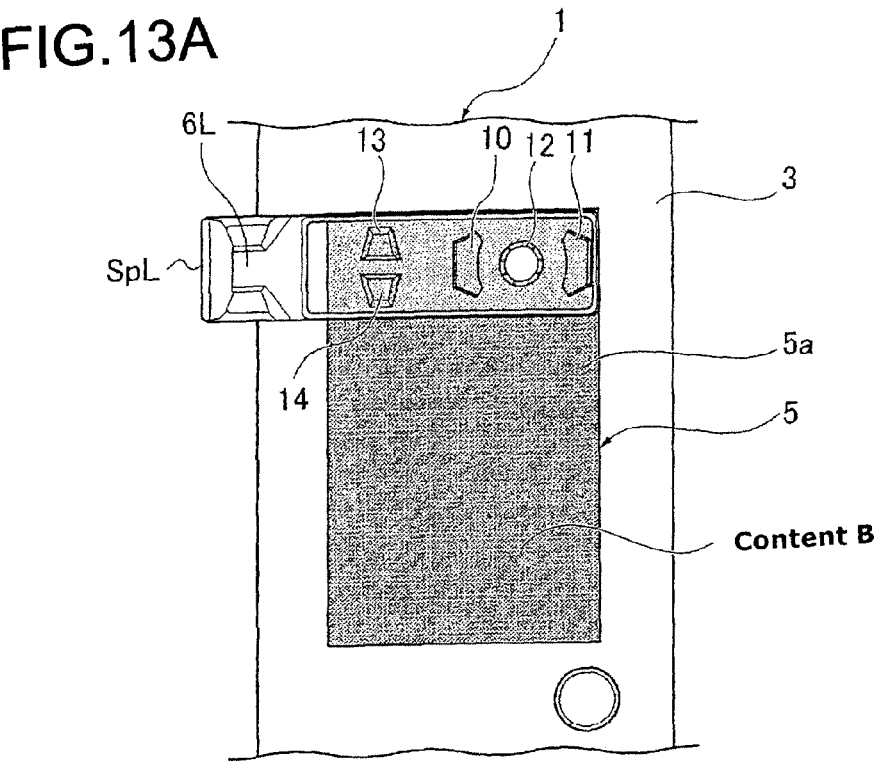
FIG. 13A An explanatory view showing a display example of content when a first switch plate of the in-car operation device shown in FIG. 11 is positioned at the upper end portion of the touch display.

For example, the arithmetic control circuit 20 displays the content B over an entire range of the touch display 5 when the first switch plate SpL is positioned at the upper end of the touch display 5 as shown in FIG. 13A.

Figure 13B:
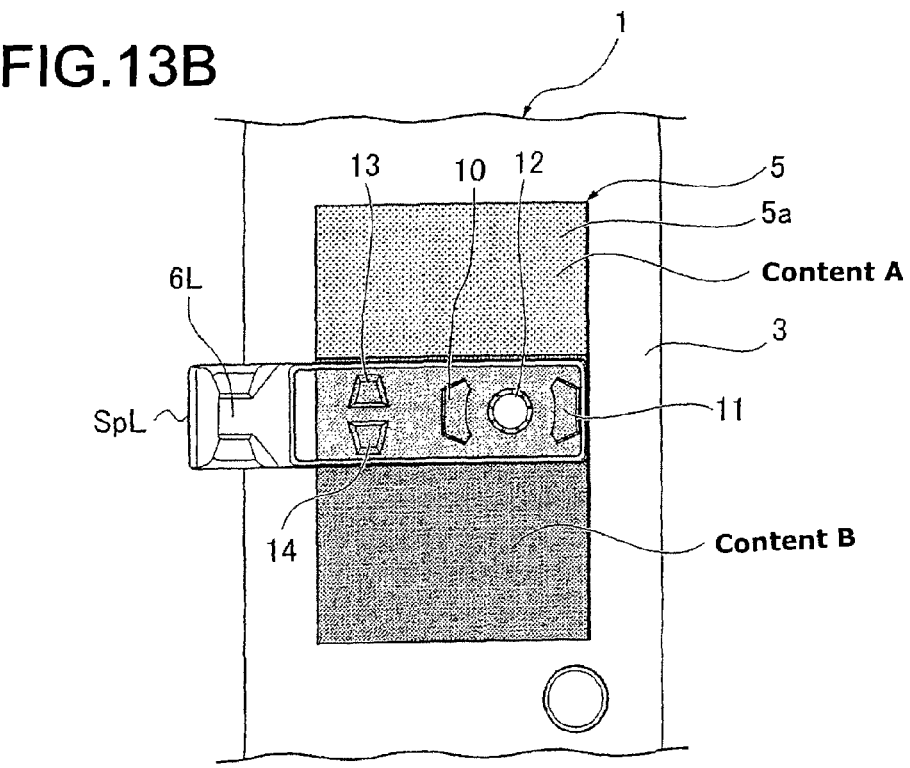
FIG. 13B An explanatory view showing a display example of contents when the first switch plate of the in-car operation device shown in FIG. 11 is positioned at the up-down-directional intermediate portion of the touch display.

Moreover, when the first switch plate SpL is positioned at the up-down-directional intermediate portion of the touch display 5 as shown in FIG. 13B, the arithmetic control circuit 20 displays the content A over a range from the upper end of the first switch plate SpL to the upper end of the touch display 5 and displays the content B over a range from the upper end of the first switch plate SpL to the lower end of the touch display 5.

Figure 13C:
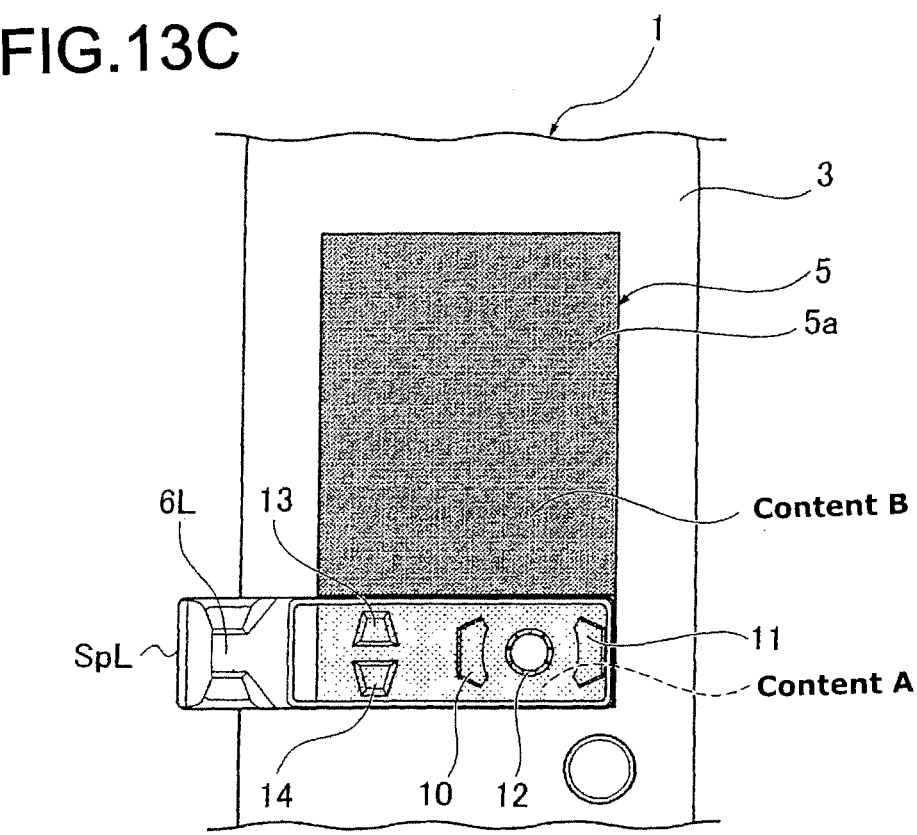
FIG. 13C An explanatory view showing a display example of contents when the first switch plate of the in-car operation device shown in FIG. 11 is positioned at the lower end portion of the touch display.

Furthermore, when the first switch plate SpL is positioned at the lower end of the touch display 5 as shown in FIG. 13C, the arithmetic control circuit 20 displays the content B over a range from the upper end of the first switch plate SpL to the upper end of the touch display 5 and displays the content A over a range from the upper end of the first switch plate SpL to the lower end of the touch display 5. At this time, the content B has a relatively large size whereas the content A has a minimum size.

According to this embodiment, in the case that a plurality of operational buttons are displayed on the touch display 5 in parallel with each other (i.e., in a side-by-side arrangement) along the right-left direction, the plurality of operational buttons can be selected by operating the touch-sensor protrusions 10 and 11. Moreover, in the case that a plurality of operational menus (or menu bars) are displayed on the touch display 5 in parallel with each other along the up-down direction, the plurality of operational menus can be selected by operating the touch-sensor protrusions 13 and 14.

In this embodiment, for example, the content B is the navigation image, and the content A is the audio-device-operation image or the air-conditioner-operation image.

(Supplemental Explanation 1)

In a common switching structure of touch display, operational frames and/or operational buttons each of which indicates its title are merely displayed on a screen of the touch display. In this structure, the operational frames and/or operational buttons of the touch display are operated by touch operations so that a screen view (displayed image) is changed and/or peripheral devices corresponding to the screen view are operated. In such a common touch display, many operational menus can be provided in a limited area and also can be flexibly arranged. However, the driver tends to gaze or watch the screen in order to find a desired operational menu because there is no concave or convex on the screen of the touch display. Hence, it is difficult to operate the touch display while driving the car.

On the other hand, in the case that an in-car operation display device is constituted by a liquid crystal display instrument or the like and hard switches (hard SW) which are placed around the liquid crystal display instrument and which are used for operating a car-installed device(s), the driver gropes for a desired switch among the hard switches and thereby can find the desired switch in a short time by tactile perception of shapes of the hard switches. By so-doing, the driver can operate the car-installed device. However, in such a case, the hard switches cannot be moved to a location convenient for the driver to use because the hard switches (hard SW) are fixed to predetermined spots. If trying to provide many hard switches at the convenient location, the number of components becomes large.

Contrary to this, in the embodiment according to the present invention, the first switch plate SpL and the second switch plate SpR (slide switches SW(L and R)) which are transparent are respectively provided on the left and right portions of the touch display 5 as touch panels. These first switch plate SpL and second switch plate SpR can move (slide) in the upper and lower directions within a view region of the touch display 5.

Because each of the first switch plate SpL and the second switch plate SpR is formed with the touch-sensor protrusions 10-15 which are concave-convex-shaped switches, the driver can recognize locations of the touch-sensor protrusions 10-15 without visual check (see FIG. 2). Because each of the first switch plate SpL and the second switch plate SpR (slide switches SW(L and R)) is made of a transparent material, the driver can see the displayed contents of the touch display 5 through the first switch plate SpL or the second switch plate SpR. The contents displayed on the touch display 5 can be changed by moving the first switch plate SpL and the second switch plate SpR in the upper and lower directions shown by the arrows A2 and A3 (see FIG. 5).

Because the transparent first and second switch plates (slide switches SW(L and R)) are provided, the locations of switches which are displayed on the touch display 5 can be found by convexoconcave. Therefore, merit of the hard switch (i.e., an ability of operating without visual check) can be added without impairing merit of the touch display 5 (i.e., an ability of freely changing design and image position). Accordingly, the driver can indirectly operate the touch display 5 even while driving the car.

Moreover, because the first and second switch plates (slide switches SW(L and R)) are movable, the driver can move each of the first and second switch plates (slide switches SW(L and R)) to a desired position of the driver. By the movement of this switch plate (slide switch SW), the view of the touch display 5 is varied so that display areas (image ranges) of the respective contents expand or contract to follow the movement. Therefore, functions of a content which is desired to be used by the driver and its display area are expanded whereas functions of a content which is not desired to be used and its display area are minimized. Thereby, a screening (separation) among much information becomes easy (see FIG. 5).

In the in-car operation display device according to the first embodiment as shown in FIGS. 1 and 2, the display areas (image ranges) of the three contents A to C are varied in dependence upon positions of the two slide switches SW(L and R). That is, the display areas are determined according to a positional relation between the slide switch SW(L) and the slide switch SW(R). The content A is always displayed on the upper portion of the display screen unless the slide switch SW(L) or the slide switch SW(R) is brought to an uppermost portion of the display screen 5a. The content B is displayed from the upper end portion of the slide switch SW(L) to the upper end of the slide switch SW(R) or to the lower end (of the display screen) of the touch display 5. In the same manner as the content B, the content C is displayed from the upper end portion of the slide switch SW(R) to the to the upper end of the slide switch SW(L) or to the lower end of the touch display 5. It is noted that the other detailed operations which are less frequently used are conducted by directly touching the touch display 5.

Because the transparent first and second switch plates (slide switches SW(L and R)) are provided, the locations of respective switches which are displayed on the touch display 5 can be found by convexoconcave. Therefore, merit of the hard switch (i.e., the ability of operating without visual check) can be added without impairing merit of the touch display 5 (i.e., the ability of freely changing design and image position). Accordingly, the driver can easily operate the touch display 5 even while driving the car.

Moreover, because the slide switches SW(L and R) are movable, the driver can move each of the slide switches SW(L and R) to a position desired by the driver. By the movement of this slide switch SW, the view of the touch display 5 is varied so that the display areas (image ranges) of the respective contents expand or contract to follow the movement. Therefore, functions of a content which is desired to be used by the driver and its display area are expanded whereas functions of a content which is not desired to be used and its display area are minimized. Thereby, a screening (separation) among much information becomes easy.

In the in-car operation display device according to the second embodiment as shown in FIG. 10, a simplification is attained by using only one slide switch SW which covers a horizontal width of the display screen. In the second embodiment, two contents are displayed. The content A is constantly displayed on the upper portion of the display screen, i.e., from the upper end of the display screen to the upper end portion of the slide switch SW. The content B is displayed from the upper end portion of the slide switch SW to the lower end (of the display screen) of the touch display 5.

Because only one slide switch SW is attached to one side of the touch display 5, patterns of display changes (image changes) are reduced so that the simplified structure can be attained.

(Supplemental Explanation 2)

As explained above, the car-state changing-operation device in the embodiments according to the present invention includes: a display unit (touch display 5) including a touch-panel-type display screen (5*a*) on which an image of a car function is displayed; an operating means (first switch plate SpL, second switch plate SpR) configured to be operated such that a car state is changed based on the image of the car function displayed on the display screen (5*a*); and a control circuit (arithmetic control circuit 20) configured to perform a display control for the image of the car function, and to control the car function by an operation of the operating means (first switch plate SpL, second switch plate SpR). Moreover, the operating means (first switch plate SpL, second switch plate SpR) includes an operating-plate portion (6L, 6R) configured to be operated to move along the display screen (5*a*) of the display unit (touch display 5), and the operating-plate portion (6L, 6R) includes a protruding switch portion (touch-sensor protrusions 10-15).

According to this structure, the protruding switch portion (touch-sensor protrusions 10-15) can be recognized by touching perception without visual check. Moreover, because the operating-plate portion (6L, 6R) is configured to be operated to move along the display screen (5*a*) so that the position of the switch portion (touch-sensor protrusions 10-15) of the operating-plate portion (6L, 6R) is moved, the operability of the display unit which is used for indications and operations such as settings and instructions of the car-installed functions can be improved.

In the car-state changing-operation device as described in the embodiments according to the present invention, the operating-plate portion (6L, 6R) is transparent or semitransparent such that the image displayed on the display screen (5*a*) can be seen through the operating-plate portion (6L, 6R).

According to this structure, even if the display screen (5*a*) overlaps with the operating-plate portion (6L, 6R), an image content (display content) of a portion of the display screen (5*a*) which entirely overlaps with the operating-plate portion (6L, 6R) can be visually recognized through the operating-plate portion (6L, 6R).

In the car-state changing-operation device as described in the embodiments according to the present invention, the display screen (5*a*) extends in the up-down direction and also in the right-left direction, and first and second guide portions (left guide slit GsL, right guide slit GsR) are provided on lateral portions of the display screen (5*a*) and extend in the up-down direction. Moreover, the operating-plate portion (6L, 6R) is included in each of first and second switch plates (SpL, SpR), and the first and second switch plates (SpL, SpR) are respectively attached to the first and second guide portions (left guide slit GsL, right guide slit GsR) along right and left portions of the display screen (5*a*) such that the first and second switch plates (SpL, SpR) are operated to move in the up-down direction. Moreover, the control circuit (arithmetic control circuit 20) is configured to control the display unit (touch display 5) in accordance with positions of the first and second switch plates (SpL, SpR) such that images of at least three car-installed functions (contents A, B and C) are displayed on the display screen (5*a*) and have sizes depending on the positions of the first and second switch plates (SpL, SpR).

According to this structure, the image sizes of the at least three car-installed functions (contents A, B and C) can be varied depending on the movement positions of the first and second switch plates (SpL, SpR) by operating the first and second switch plates (SpL, SpR). Hence, one or more image among the images of the at least three car-installed functions (contents A, B and C) can be displayed more largely than the remaining one(s). Thereby, an operability of necessary image(s) among the images of the car-installed functions (contents A, B and C) by visual recognition can be improved.

EXPLANATION OF REFERENCE SIGNS

1 Center cluster
5 Touch display (Display unit)
5*a* Display screen
6L Left operating-plate portion
6R Right operating-plate portion
10 Touch-sensor protrusion
11 Touch-sensor protrusion
12 Touch-sensor protrusion
13 Touch-sensor protrusion
14 Touch-sensor protrusion
15 Touch-sensor protrusion
A Content
B Content
C Content
GsL Left guide slit (First guide portion)
GsR Right guide slit (Second guide portion)

SpL First switch plate (operating means)
SpR Second switch plate (operating means)

What is claimed is:

1. An in-car operation display device, comprising:
a display unit including a touch-panel-type display screen on which an image of a car-installed function is displayed;
an operating section configured to be operated such that a car state is varied based on the image of the car-installed function displayed on the display screen; and
a control circuit configured to perform a display control for the image of the car-installed function, and to control the car-installed function by an operation of the operating section,
wherein
the operating section includes an operating-plate portion configured to be operated to move along the display screen of the display unit, and
the operating-plate portion includes a protruding switch portion,
the display screen extends in an up-down direction and also in a right-left direction,
first and second guide portions are provided on lateral portions of the display screen and extend in the up-down direction,
the operating-plate portion is included in each of first and second switch plates,
the first and second switch plates are respectively attached to the first and second guide portions along right and left portions of the display screen such that the first and second switch plates are operated to move in the up-down direction,
the control circuit is configured to control the display unit in accordance with positions of the first and second switch plates so as to partition the display screen into a plurality of display areas and adjust a size or a shape of each of the display areas to thereby display the image of the car-installed function adjusted in accordance with the size or the shape of each of the display areas on each of the display areas, and
the control circuit is further configured to partition the display screen at a position of an upper edge portion of at least the operating-plate portion as a boundary when the first and second switch plates are differently positioned.

2. The in-car operation display device according to claim 1, wherein the operating-plate portion is transparent or semitransparent such that the image displayed on the display screen is visible through the operating-plate portion.

* * * * *